US008311980B2

(12) United States Patent
Saito et al.

(10) Patent No.: US 8,311,980 B2
(45) Date of Patent: Nov. 13, 2012

(54) NAMESPACE CONSISTENCY FOR A WIDE-AREA FILE SYSTEM

(75) Inventors: Yasushi Saito, Mountain View, CA (US); Christos Karamanolis, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2516 days.

(21) Appl. No.: 10/726,041

(22) Filed: Dec. 1, 2003

(65) Prior Publication Data

US 2004/0172421 A1 Sep. 2, 2004

Related U.S. Application Data

(63) Continuation-in-part of application No. 10/315,583, filed on Dec. 9, 2002.

(51) Int. Cl.
*G06F 17/30* (2006.01)
(52) U.S. Cl. ...................................................... 707/610
(58) Field of Classification Search ................... 707/100, 707/204
See application file for complete search history.

(56) References Cited

U.S. PATENT DOCUMENTS

| | | | | |
|---|---|---|---|---|
| 6,070,164 | A * | 5/2000 | Vagnozzi | 707/100 |
| 2001/0044879 | A1 * | 11/2001 | Moulton et al. | 711/114 |
| 2002/0107835 | A1 * | 8/2002 | Coram et al. | 707/1 |

OTHER PUBLICATIONS

Peter Reiher et al., Resolving file conflicts in the Ficus File System, Jun. 1994 (ftp://ftp.cs.ucla.edu/pub/ficus/usenix_summer_94_resolver.ps.gz).*
Muthitacharoen, et al., Ivy: A Read/Write Peer-to-Peer File System, Dec. 2002, ACM.*
Brereton, Pearl, Detection and Resolution of Inconsistencies Among Distributed Replicates of Files, 1983, ACM.*
Popek, Gerald J. et al. "Replication in Ficus Distributed File Systems" Nov. 1990.*
Panagiotis Christias, "UNIX man pages : cp()" Nov. 1998 www.unixhelp.ed.ac.uk.*
Atul Adya, William J. Bolosky, Miguel Castro, Ronnie Chaiken, Gerald Cermak, John R. Douceur, John Howell, Jacob R. Lorch, Marvin Theimer, and Roger Wattenhofer, Farsite: Federated, available, and reliable storage for an incompletely trusted environment. 5th Symposium. on Operating System Design and Implementation (OSDI), Boston, MA, USENIX, Berkeley, CA, Dec. 9-11, 2002.

(Continued)

*Primary Examiner* — Etienne Leroux

(57) ABSTRACT

The invention is a system for and a method of maintaining namespace consistency in a wide-area file system. In one embodiment, a wide-area file system has a plurality of replicas for a file. Each replica of a file and parent directories for the file are at a node. An update to a replica of the file is propagated to other replicas of the file. In response to receiving a propagated update to a replica at a node, the replica for the file at the node is updated. A directory operation (e.g., rename, link or unlink) may affect a backpointer for a replica. When a backpointer for a replica at a node is not consistent with the parent directories for the replica at the node, the the parent directories are modified to be consistent with the backpointer. A modification may be performed at a node while an earlier inconsistent modification may be ignored. As a result, consistency is maintained among the replicas.

29 Claims, 22 Drawing Sheets

OTHER PUBLICATIONS

Alan J. Demers, Daniel H. Greene, Carl Hauser, Wes Irish, John Larson, Scott Shenker, Howard Sturgis, Dan Swinehart, and Doug Terry, Epidemic Algorithms for Replicated Database Maintenance, Proceedings of the 6th Annual ACM Symposium on Principles of Distributed Computing (PODC), Vancouver, BC, Canada, pp. 1-12, ACM Press, New York, NY, Aug. 1987.

Minwen Ji, Edward W. Felten, Randolph Wang, and Jaswinder P. Singh, Archipelago: an island-based file system for highly available and scalable Internet services. In USENIX Windows Systems Symposium, Seattle, WA, USENIX, Berkeley, CA, Aug. 2000.

James J. Kistler and M. Satyanarayanan Disconnected operation in the Coda file system, ACM Transactions on Computer Systems (TOCS), vol. 10, Issue 5 pp. 3-25, ACM Press, New York, NY, Feb. 1992.

D. S. Parker, Gerald Popek, Gerard Rudisin, Allen Stoughton, Bruce Walker, Evelyn Walton, Johanna Chow, David Edwards, Stephen Kiser, and Charles Kline, Detection of mutual inconsistency in distributed systems, IEEE Transactions on Software Engineering, SE-9(3), pp. 240-247, IEEE computer Society, Los Alamitos, CA, 1983.

David H. Ratner, Roam: A Scalable Replication System for Mobile and Distributed Computing, PhD thesis, Technical Report No. UCLA-CSD-970044, UCLA Computer Science Department, Los Angeles, CA, 1998.

Robert H. Thomas, A Majority Consensus Approach to Concurrency Control for Multiple Copy Databases, ACM Transactions on Database Systems (TODS), vol. 4 No. 2, pp. 180-209, ACM Press, New York, NY, Jun. 1979.

Bruce Walker, Gerald Popek, Robert English, Charles Kline, and Greg Thiel, The Locus distributed operating system, Proceedings of the Ninth ACM Symposium on Operating Systems Principles (SOSP), Bretton Woods, NH, pp. 49-70, ACM Press, New York, NY, Oct. 1983.

Haifeng Yu and Amin Vahdat, The Costs and Limits of Availability for Replicated Services, Proceedings of the Eighteenth ACM Symposium on Operating System Principles (SOSP), Lake Louise, AB, Canada, pp. 29-42, ACM Press, New York, NY, Oct. 2001.

Zheng Zhang and Christos Karamanous, Designing a Robust Namespace for Distributed File Services, 20th IEEE Symposium on Reliable Distributed Systems (SRDS), New Orleans, LA, pp. 162-173, IEEE Computer Society, Los Alamitos, CA, Oct. 2001.

Yasushi Saito and Christos Karamanolis, Pangaea: A symbiotic wide-area file system, ACM SIGOPS European Workshop, Saint-Emillion, France, Sep. 2002.

Yasushi Saito and Christos Karamanolis, Name space consistency in the Pangaea wide-area file system, HPL SSP Technical Memo No. 2002-12, Hewlett-Packard, Palo Alto, CA, Dec. 4, 2002.

Paul R Johnson, Robert H. Thomas, RFC 677: The Maintenance of Duplicate Databases, Jan. 27, 1975. < http://rfc.sunsite.dk/rfc/rfc677.html>.

David L. Mills, RFC 1305—Network Time Protocol (Version 3) Specification, Implementation and Analysis, Mar. 1992. < http://www.faqs.org/rfcs/rfc1305.html>.

Yasushi Saito, Christos Karamanolis, Magnus Karlsson, and Mallik Mahalingam, Taming aggressive replication in the Pangaea wide-area file system, 5th Symposium on Operating System Design and Implementation (OSDI 2002), Boston, MA, USENIX, Berkeley, CA, Dec. 9-11, 2002.

Darrell Anderson, Jeff Chase, and Amin Vahdat. Interposed Request Routing for Scalable Network Storage, Technical Report CS-2000-05, Department of Computer Science, Duke University, Durham, NC, May 2000.

Armando Fox, and Eric A. Brewer, Harvest, Yield, and Scalable Tolerant Systems, The Seventh Workshop on Hot Topics in Operating Systems, Rio Rico, AZ, pp. 174-178, IEEE Computer Society, Los Alamitos, CA, Mar. 28-30, 1999.

John D. Strunk, Garth R Goodson, Adam G. Pennington, Craig A. N. Soules, Gregory R Ganger, Intrusion Detection, Diagnosis, and Recovery with Self-Securing Storage, Technical Report CMU-CS-02-140, School of Computer Science, Carnegie Mellon University, Pittsburgh, PA, May 2002.

J. M. Spivey, The Z Notation: A Reference Manual (Second Edition), Oxford, England, 1998. < http://spivey.oriel.ox.ac.uk/mike/zrm/zrm.pdf>.

* cited by examiner

Key attributes of a replica
```
struct Replica
    fid: FileID                       // 96 bit globally unique file ID
    ts: TimeStamp                     // Pair of hphysical clock, IP addri
    vv: VersionVector                 // Maps IP addr 7: TimeStamp
    goldPeers: Set(NodeID)            // Set of IP addresses
    peers: Set (NodeID)
    backptrs: Set(FileID, String)     // Pair of hdirID, fnamei
    .
    .
end
struct DirEntry
    fname: String
    fid: FileID
    downlinks: Set (NodeID)
    ts: Timestamp
end
```

FIG. 3

```
proc UpdateReplica
  r₂: Replica // New replica contents.
preconditions:
  ∀ ⟨pfid,fname⟩: r₂.bptrs • pfid ∈ dom(DISK)
    and IsLive(r₂) ⇒ IsLive(DISK(pfid))
postconditions:
  r₂.bptr ≠ {} ⁽³⁾
...
```

FIG. 4

- "$\langle val_1, \ldots, val_n \rangle$" represents a tuple of values.
- "$\mathbb{P}$ type" represents a (possibly empty) set of type. "$\mathbb{P}_1$ type" represents a nonempty set of type. "Key ↦ Val" represents a one-to-many mapping from type Key to Val.
- "dom($F$)" returns the domain of function (or mapping) $F$, and "ran($F$)" returns the range of $F$. For instance, $$\text{dom}(\{1 \mapsto 3, 2 \mapsto 8, 4 \mapsto 3\}) = \{1,2,4\},$$
$$\text{ran}(\{1 \mapsto 3, 2 \mapsto 8, 4 \mapsto 3\}) = \{3,8\}.$$

- "$X \oplus Y$" substitutes a part of mapping X by Y. E.g., $$\{1 \mapsto 3, 2 \mapsto 1\} \oplus \{1 \mapsto 5, 3 \mapsto 4\}$$
$$= \{1 \mapsto 5, 2 \mapsto 1, 3 \mapsto 4\}.$$

- "$X \triangleleft Y$" means function-domain restriction. E.g., $$\{2\} \triangleleft \{1 \mapsto 3, 2 \mapsto 8, 4 \mapsto 6\} = \{1 \mapsto 3, 4 \mapsto 6\}.$$

- "∀*var: set* •*expr*" means that *expr* holds for *var* in *set*. E.g., $$\forall n : \{11, 13, 17\} \bullet \text{IsPrime}(n).$$

- "◇ *expr*" means that *expr* holds eventually.
- "{*var: set* •*expr*}" means set comprehension. E.g., $$\{x : \{1,2,3\} \bullet x^2\} = \{1,4,9\}.$$

FIG. 5

```
type Replica = record
    fid⁽¹⁾ : FileID
    peers⁽²⁾ : ℙ NodeID
    gpeers⁽³⁾ : ℙ₁ NodeID
    bptrs⁽⁴⁾ : ℙ Backptr
    deadBptr⁽⁵⁾ : Backptr
    ts⁽⁶⁾ : Timestamp
type RegularReplica inherits Replica =
    contents⁽⁷⁾ : Data
    Invariants:
        ¬IsLive(r) ⇒ contents = {}
type DirReplica inherits Replica =
    ents⁽⁸⁾ : ⟨FileID,String⟩ ↣ DEntry
    Invariants:
        ¬IsLive(r) ⇒ ents = {}
type Backptr = ⟨FileID, String⟩
type Dentry = record
    valid⁽⁹⁾ : bool
    ts⁽¹⁰⁾ : Timestamp
    gpeers⁽¹¹⁾ : ℙ₁ NodeID
proc IsLive(r)
    return r is the root or r.bptrs ≠ {}
```

$$FIG.\ 6$$

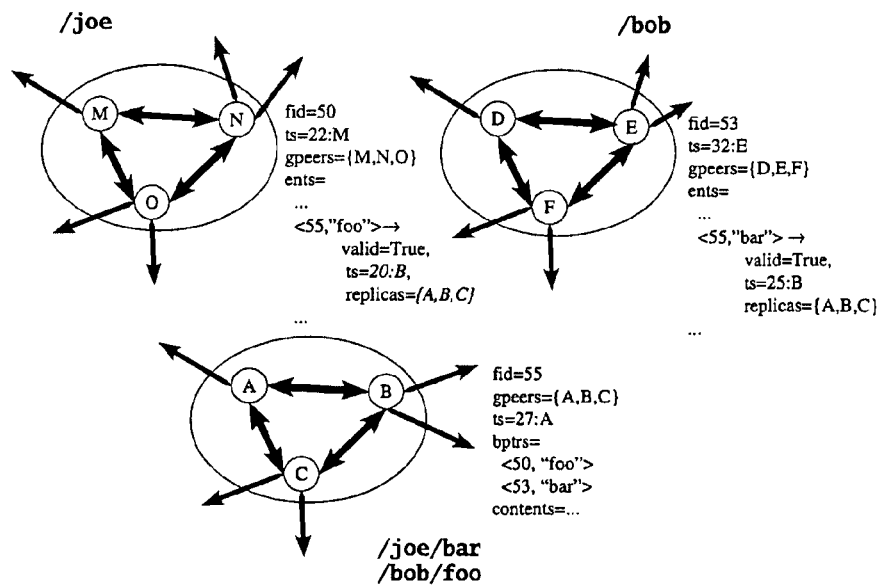

$$FIG.\ 7$$

*DISK:* FileID ↣ Replica
*CLOG:* FileID ↣ ℙ₁ NodeID
*ULOG:* FileID ↣ ℙ Backptr
Invariants:
  // Updates are only for existing replicas.
  dom(*CLOG*) ∪ dom(*ULOG*) ⊆ dom(*DISK*)  (12)

FIG. 8 proc Create
  *d:* DirReplica // The local replica of the parent directory.
  *fname:* string // The name of the new file in *d*
  *gpeers:* ℙ₁ NodeID // The placement of the replicas of the file.
preconditions:
  IsLive(*d*)  (13)

---

*r* ← Newreplica()
  *r.fid* ← Newfileid()
  *r.gpeers* ← *gpeers*
  *r.ts* ← Newtimestamp()
  *r.peers* ← {}
  *r.bptrs* ← {⟨*d.fid, fname*⟩}
  *r.contents* ← None
  UpdateReplica(*r*)

FIG. 9 proc Unlink
  *f:* Replica // The file to be unlinked.
  *d:* DirReplica // The directory the file belongs to.
  *fname:* string // *f*'s name in *d*.
preconditions:
  IsLive(*d*)
  *f* is a directory ⇒ *f.ents* = {}
  ⟨*d.fid,fname*⟩ ∈ *f.bptrs*

---

*f'* ← Deepcopy(*f*)
  *f'.bptrs* ← *f.bptrs* \ {⟨*d.fid,fname*⟩}
  if *f'.bptrs* = {} then
    *f'.deadBptr* ← ⟨*d.fid,fname*⟩
  *f'.ts* ← Newtimestamp()
  UpdateReplica(*f'*)

FIG. 10

```
proc Hardlink
    f: RegularReplica // The replica of the file.
    d: DirReplica // The directory to which f will be linked to.
    fname: string // The filename within d.
preconditions:
    IsLive(d)
─────────────────────────────────────────────
    f' ← Deepcopy(f)
    f'.bptrs ← f.bptrs ∪ {⟨d.fid, fname⟩}
    f'.ts ← Newtimestamp()
    UpdateReplica(f')
```

FIG. 11

```
proc Rename
    f: Replica // The file to be moved.
    d_F: DirReplica // The origin dir.
    d_T: DirReplica // The destination dir.
    fname_F: string // The filename in d_F
    fname_T: string // The filename in d_T
preconditions:
    IsLive(d_F) and IsLive(d_T)
    ⟨d_F.fid, fname_F⟩ ∈ f.bptrs
─────────────────────────────────────────────
    f' ← Deepcopy(f)
    f'.bptrs ← f.bptrs \ {⟨d_F.fid,fname_F⟩} ∪ {⟨d_T.fid,fname_T⟩}
    f'.ts ← Newtimestamp()
    UpdateReplica(f')
```

FIG. 12

```
proc Write
    f: RegularReplica
    newcontents: Data
─────────────────────────────────────────────
    f' ← Deepcopy(f)
    f'.contents ← newcontents
    f'.ts ← Newtimestamp()
    UpdateReplica(f')
```

FIG. 13

```
proc UpdateReplica
    r₂: Replica // New replica contents.
preconditions:
    // All parent directories are stored locally.
    // Moreover, if r₂ is live, then parent must also be live.
    ∀ ⟨pfid,fname⟩: r₂.bptrs • pfid ∈ dom(DISK)
        and IsLive(r₂) ⇒ IsLive(DISK(pfid))    (14)
```

```
if r₂.fid ∉ dom(DISK) then
    // The replica isn't locally stored yet.
    DISK ← DISK ∪ { r₂.fid ↦ r₂ }
    IssueCupdate(r₂)
    return r₁ ← DISK(r₂.fid)

if File is regular then
    Do some application-specific stuff.
    We can potentially use version vectors here.
else
    // Union dir entries, taking ones with newer timestamps on conflict.
    for (key ↦ e) ∈ r₂.ents
        if key ∉ dom(r₁.ents) or r₁.ents(key).ts < e.ts
            r₁.ents ← r₁.ents ⊕ {key ↦ e}
        for each added or deleted entry ⟨fid,fname⟩ in r₁.ents
            // Entry ⟨fid,fname⟩ is potentially inconsistent. Fix up later.
            if fid ∈ dom(DISK) then
                IssueUupdate(DISK(fid), {})⁽¹⁵⁾ if r₂.ts > r₁.ts then⁽¹⁶⁾
    // The file's attributes are to be updated.
    r₁.ts ← r₂.ts
    if r₁.gpeers ≠ r₂.gpeers then
        r₁.gpeers ← r₂.gpeers
        // When the replica's gold-peer set changes, I must reflect the
        // change to the parent dir entry.
        IssueUupdate(r, {})

// Resolve potential conflicts on back pointers
    if r₁.bptrs ≠ r₂.bptrs or r₁.deadBptr ≠ r₂.deadBptr then
        IssueUupdate(r₁, r₁.bptrs \ r₂.bptrs)⁽¹⁷⁾
        r₁.bptrs ← r₂.bptrs
        r₁.deadBptr ← r₂.deadBptr // If the last link to the replica is gone, erase the contents.
    if ¬ IsLive(r₁) then
        if r₁ is a regular file then
            r₁.contents ← None
        else
            for e ∈ r₁.ents • e.valid
                IssueUupdate(DISK(e.fid), {})⁽¹⁸⁾
            r₁.ents ← {} if Any of r₁'s attributes has changed then
    IssueCupdate(r₁)⁽¹⁹⁾
```

FIG. 14

Adding or deleting a bronze replica (1) B find gold replica A in the parent dir entry. B asks A to send contents.

(2) A asks C to send contents to B (2) Find new peers using random walks starting from A.

(3) Issue RPCs from B to the picked nodes.

(4) Final state.

```
Protocol for adding a replica.

Constants:
    M: Number of neighbors per replica.
    MAXHOPS: The number of hops per a random walk (the
usual value is 3)

# AddReplica is the main procedure that adds
# a replica of file F on the executing node.

AddReplica(F, G)
    G: the set of gold replicas of F.
    (G is obtained by looking up the parent directory)

g = Pick a random live node in G.
    Send to g, "CreateReplica(F, myself)"
    Wait for the contents to arrive.
    Store contents and reply the client.

r = find the replica of F.
    Send to g, "StartRandomWalk(F, myself)"
    Wait for the set of neighbors N to arrive.
    for n in N:
        Add edge to n in r.
        Send to n, "AddEdge(F, myself)"

SendReplicaContents(F, Sender):
    F: the ID of the file
    Sender: the node requesting replica creation.

r = find the replica of F
    n = pick the replica closest to Sender among
graphneighbors of r.
        Send to n, "SendReplicaContents(F, Sender)"

SendReplicaContents(F, Sender):
    F: the ID of the file
    Sender: the node requesting replica creation.

r = find the replica of F
    Send r to Sender.

StartRandomWalk(F, Sender):
    F: the ID of the file
    Sender: the node requesting replica creation.
```

*FIG. 16A*

```
        r = find the replica of F
        N = {}
        for i = 0 to M-2:
            n = pick random graph neighbor in r.
         Send to n, "DoRandomWalk(F, 0, myself)"
         Receive nodeid from n.
         Add nodeid to N.
        Send N to Sender.

DoRandomWalk(F, hops, prevHopNode):
        F: the ID of the file
        hops: the number of hops made so far.

if hops == MAXHOPS
            Send myself to prevHopNode
        else
            r = find the replica of F.
            n = pick random graph neighbor in r
            Send to n, "DoRandomWalk(F, hops + 1, myself)"
            Receive nodeid from n.
            Send nodeid to prevHopNode AddEdge(F, peer):
        F: the ID of the file
        peer: the node to span edge to
        r = find the replica of F
        Add edge to peer in r
```

FIG. 16B proc IssueCupdate
  *r:* Replica // The replica of the file being updated.

---

$CLOG(r.fid) \leftarrow r.gpeers \cup r.peers$

--- proc PropagateCupdate // Runs periodically in the background

--- for $(fid \mapsto targets) \in CLOG$
  $r \leftarrow DISK(fid)$ // See ⟨12⟩.
  // Send the location of the parent dirs so that the target can
  // replicate them to ensure name-space containment.
  $pDirs \leftarrow \{p: r.bptrs \bullet \langle p.fid, DISK(p.fid).gpeers \rangle\}$ // See ⟨14⟩.
  for $n \in targets$
    send ⟨*CUPDATE, r, pDirs*⟩ to *n*.
when receive ⟨*CUPDATE-REPLY, ts*⟩ from node *n*
  if $CLOG(fid).ts = ts$
    $CLOG(fid) \leftarrow CLOG(fid) \setminus \{n\}$
    Remove *fid* from CLOG when CLOG(*fid*) becomes empty

--- when receive ⟨*CUPDATE, r, pDirs*⟩
  *r:* Replica // New replica contents.
  *pDirs:* $\mathbb{P}$ ⟨FileID, $\mathbb{P}$ NodeID⟩ // Name and location of parent dirs.

--- for ⟨*pfid, ppeers*⟩ $\in pDirs$
  CreateReplica(*pfid, ppeers*)
  ResurrectDirectory(*pfid*)
UpdateReplica(*r*)
send⟨*CUPDATE-REPLY, r.ts*⟩

*FIG. 18* proc IssueUupdate
  *r*: Replica // The replica of the file
  *del*: $\mathbb{P}$ ⟨FileID,String⟩ // Backpointers deleted from the replica.

--- if *r.fid* ∈ dom(*ULOG*) then
  *del* ← *del* ∪ *ULOG*(*r.fid*)
*ULOG* ← *ULOG* ⊕ {*r.fid* ↦ *del*}

--- proc ProcessUupdate // Called periodically in the background.

--- for (*fid* ↦ *del*) ∈ *ULOG*
  *r* ← *DISK*(*fid*) // See ⟨12⟩.
  for *pfid, fname* ∈ *del* ∪ *r.bptrs*
    ResurrectDirectory(*pfid*)
    *d* ← *DISK*(*pfid*)
    *valid* = *pfid* ∈ *r.bptrs* // Is this entry to be added?
    *new* = {⟨*fid,fname*⟩ ↦ Dentry(*valid*, *r.ts*, *r.gpeers*)}
    *d.ents* ← (⟨*fid,fname*⟩ ◁ *d.ents*) ∪ *new*
    if *d.ents* has changed
      *d.ts* ← Newtimestamp()
      IssueCupdate(*d*)
*ULOG* ← {}

*FIG. 19* proc CreateReplica
  *fid:* FileID // The ID of the file
  *peers:* $\mathbb{P}_1$ NodeID // The known set of gold peers of the file
postconditions:
  *fid* ∈ dom(*DISK*)

--- if *fid* ∈ dom(*DISK*) then
    return
send ⟨*SEND-CONTENTS, fid*⟩ to random node *n* ∈ *peers*
Wait until receive ⟨*CONTENTS, r, pDirs*⟩ from *n*
for ⟨*pfid, ppeers*⟩ ∈ *pDirs*
    CreateReplica(*pfid, ppeers*)
UpdateReplica(*r*)
Add edges between *r* and random existing replicas.

--- when receive ⟨*SEND-CONTENTS, fid*⟩ from node *n*

---

*r* ← *DISK*(*fid*)
*pDirs* ← {*p*: *r.bptrs* • ⟨*p.fid, DISK*(*p.fid*).*gpeers*⟩} // See ⟨14⟩.
send ⟨*CONTENTS, r, pDirs*⟩ to *n*.

*FIG. 20* proc ResurrectDirectory
  *fid:* FileID
preconditions:
  *fid* ∈ dom(*DISK*)
  *fid* is a directory
postconditions:
  IsLive(*DISK*(*fid*))

---

*r* ← *DISK*(*fid*)
if IsLive(*r*) then
  return

ResurrectDirectory(*r.deadBptr.pfid*)
*r.bptrs* ← { *r.deadBptr* }
*r.ts* ← Newtimestamp()
IssueCupdate(*r*)
let ⟨*pfid, fname*⟩ = *r.deadBptr* •
  *d* ← *DISK*(*pfid*)
  *d.ents*(⟨*fid,fname*⟩) ← Dentry(*true, r.ts, r.gpeers*) [20]
  *d.ts* ← Newtimestamp()
  IssueCupdate(*d*)

*FIG. 21*

| A | $fid_/$ | 5:A | ents={⟨$fid_{alice}$, "alice", 12:A⟩} |
|---|---|---|---|
|   | $fid_{alice}$ | 12:A | ents={*⟨$fid_{bar}$, "bar", 13:B⟩} |

FIG. 22

| A | $fid_/$ | 5:A | ents={⟨$fid_{foo}$, "foo",...⟩} |
|---|---|---|---|
|   | $fid_{alice}$ | 6:A | ents={} |
|   | $fid_{foo}$ | 8:A | bptrs=⟨$fid_/$, "foo"⟩ |
| B | $fid_/$ | 5:A | ents={⟨$fid_{foo}$, "foo",...⟩} |
|   | $fid_{bob}$ | 7:B | ents={} |
|   | $fid_{foo}$ | 8:A | bptrs=⟨$fid_/$, "foo"⟩ |

FIG. 23

| A | $fid_/$ | 10:A | ents={*⟨$fid_{foo}$, "foo",...⟩} |
|---|---|---|---|
|   | $fid_{alice}$ | 11:A | ents={⟨$fid_{foo}$, "foo1", 12:A⟩} |
|   | $fid_{foo}$ | 12:A | bptrs=⟨$fid_{alice}$, "foo1"⟩ |
| B | $fid_/$ | 5:A | ents={⟨$fid_{foo}$, "foo",...⟩} |
|   | $fid_{bob}$ | 7:B | ents={} |
|   | $fid_{foo}$ | 8:A | bptrs=⟨$fid_/$, "foo"⟩ |

FIG. 24

| A | $fid_/$ | 10:A | ents={*⟨$fid_{foo}$, "foo",...⟩} |
|---|---|---|---|
|   | $fid_{alice}$ | 11:A | ents={⟨$fid_{foo}$, "foo1", 12:A⟩} |
|   | $fid_{foo}$ | 12:A | bptrs=⟨$fid_{alice}$, "foo1"⟩ |
| B | $fid_/$ | 9:B | ents={*⟨$fid_{foo}$, "foo",...⟩} |
|   | $fid_{bob}$ | 11:B | ents={⟨$fid_{foo}$, "foo2", 12:B⟩} |
|   | $fid_{foo}$ | 12:B | bptrs=⟨$fid_{bob}$, "foo2"⟩ |

FIG. 25

| | | | |
|---|---|---|---|
| A | $fid_/$ | 10:A | ents={*⟨$fid_{foo}$,"foo",...⟩} |
| | $fid_{alice}$ | 14:A | ents={*⟨$fid_{foo}$, "foo1", 12:B⟩} |
| | $fid_{bob}$ | 11:B | ents={⟨$fid_{foo}$, "foo2", 12:B⟩} |
| | $fid_{foo}$ | 12:B | bptrs=⟨$fid_{bob}$, "foo2"⟩ |
| B | $fid_/$ | 9:B | ents={*⟨$fid_{foo}$, "foo",...⟩} |
| | $fid_{bob}$ | 11:B | ents={⟨$fid_{foo}$, "foo2", 12:B⟩} |
| | $fid_{foo}$ | 12:B | bptrs=⟨$fid_{bob}$, "foo2"⟩ |

FIG. 26

| | | | |
|---|---|---|---|
| A | $fid_/$ | 10:A | ents={*⟨$fid_{foo}$,"foo",...⟩} |
| | $fid_{alice}$ | 14:A | ents={*⟨$fid_{foo}$, "foo1", 12:B⟩} |
| | $fid_{bob}$ | 11:B | ents={⟨$fid_{foo}$, "foo2", 12:B⟩} |
| | $fid_{foo}$ | 12:B | bptrs=⟨$fid_{bob}$, "foo2"⟩ |
| B | $fid_/$ | 10:A | ents={*⟨$fid_{foo}$, "foo",...⟩} |
| | $fid_{bob}$ | 11:B | ents={⟨$fid_{foo}$, "foo2", 12:B⟩} |
| | $fid_{foo}$ | 12:B | bptrs=⟨$fid_{bob}$, "foo2"⟩ |

FIG. 27

| | | | |
|---|---|---|---|
| A | $fid_/$ | 5:A | ents={⟨$fid_{foo}$, "foo", 6:A⟩} |
| | $fid_{foo}$ | 6:A | bptrs={⟨$fid_{foo}$, "foo"⟩} |
| B | $fid_/$ | 5:A | ents={⟨$fid_{foo}$, "foo", 6:A⟩} |
| | $fid_{foo}$ | 6:A | bptrs={⟨$fid_{foo}$, "foo"⟩} |

FIG. 28

| | | | |
|---|---|---|---|
| A | $fid_/$ | 10:A | ents={*⟨$fid_{foo}$, "foo", 11:A⟩} |
| | $fid_{foo}$ | 11:A | bptrs={} |
| B | $fid_/$ | 5:A | ents={⟨$fid_{foo}$, "foo", 6:A⟩} |
| | $fid_{foo}$ | 6:A | bptrs={⟨$fid_{foo}$, "foo"⟩} |

FIG. 29

| | | | |
|---|---|---|---|
| A | $fid_/$ | 10:A | ents={*⟨$fid_{foo}$, "foo", 11:A⟩} |
| | $fid_{foo}$ | 11:A | bptrs={} |
| B | $fid_/$ | 5:A | ents={⟨$fid_{foo}$, "foo", 6:A⟩} |
| | $fid_{foo}$ | 11:B | bptrs={⟨$fid_{foo}$, "foo"⟩} |

FIG. 30

| | | | |
|---|---|---|---|
| A | $fid_/$ | 12:A | ents={⟨$fid_{foo}$, "foo", 11:B⟩} |
| | $fid_{foo}$ | 11:B | bptrs={⟨$fid_{foo}$, "foo"⟩} |
| B | $fid_/$ | 12:A | ents={⟨$fid_{foo}$, "foo", 11:B⟩} |
| | $fid_{foo}$ | 11:B | bptrs={⟨$fid_{foo}$, "foo"⟩} |

FIG. 31

| | | | |
|---|---|---|---|
| A | $fid_/$ | 12:B | ents={*⟨$fid_{foo}$, "foo", 11:A⟩} |
| | $fid_{foo}$ | 11:A | bptrs={} |
| B | $fid_/$ | 12:B | ents={*⟨$fid_{foo}$, "foo", 11:A⟩} |
| | $fid_{foo}$ | 11:A | bptrs={} |

FIG. 32

| | | | |
|---|---|---|---|
| A | $fid_/$ | 5:A | ents={⟨$fid_{foo}$, "foo", 6:A⟩} |
| | $fid_{foo}$ | 6:A | ents={}, bptrs={⟨$fid_/$, "foo"⟩} |
| B | $fid_/$ | 5:A | ents={⟨$fid_{foo}$, "foo", 6:A⟩} |
| | $fid_{foo}$ | 6:A | ents={}, bptrs={⟨$fid_/$, "foo"⟩} |

FIG. 33

| | | | |
|---|---|---|---|
| A | $fid_/$ | 5:A | ents={⟨$fid_{foo}$, "foo", 6:A⟩} |
| | $fid_{foo}$ | 10:A | ents={⟨$fid_{bar}$, "bar", 11:A⟩}, bptrs={⟨$fid_/$, "foo"⟩} |
| | $fid_{bar}$ | 11:A | bptrs={⟨$fid_{foo}$, "bar"⟩} |
| B | $fid_/$ | 5:A | ents={⟨$fid_{foo}$, "foo", 6:A⟩} |
| | $fid_{foo}$ | 6:A | ents={}, bptrs={⟨$fid_/$, "foo"⟩} |

FIG. 34

| A | $fid_/$ | 5:A | ents={⟨$fid_{foo}$, "foo", 6:A⟩} |
| --- | --- | --- | --- |
| | $fid_{foo}$ | 10:A | ents={⟨$fid_{bar}$, "bar", 11:A⟩},<br>bptrs={⟨$fid_/$, "foo"⟩} |
| | $fid_{bar}$ | 11:A | bptrs={⟨$fid_{foo}$, "bar"⟩} |
| B | $fid_/$ | 8:B | ents={*⟨$fid_{foo}$, "foo", 10:B⟩} |
| | $fid_{foo}$ | 10:B | ents={}, bptrs={} |

*FIG. 35*

| A | $fid_/$ | 8:B | ents={*⟨$fid_{dir}$, "dir", 10:B⟩} |
| --- | --- | --- | --- |
| | $fid_{dir}$ | 10:B | ents={}, bptrs={} |
| | $fid_{foo}$ | 11:A | bptrs={⟨$fid_{dir}$, "foo"⟩} |
| B | $fid_/$ | 8:B | ents={*⟨$fid_{dir}$, "dir", 10:B⟩} |
| | $fid_{dir}$ | 10:B | ents={}, bptrs={} |

*FIG. 36*

| A | $fid_/$ | 12:A | ents={⟨$fid_{dir}$, "dir", 13:A⟩} |
| --- | --- | --- | --- |
| | $fid_{dir}$ | 13:A | ents={⟨$fid_{foo}$, "foo", 11:A⟩} |
| | $fid_{foo}$ | 11:A | bptrs={⟨$fid_{dir}$, "foo"⟩} |
| B | $fid_/$ | 12:A | ents={⟨$fid_{dir}$, "dir", 13:A⟩} |
| | $fid_{dir}$ | 13:A | ents={⟨$fid_{foo}$, "foo", 11:A⟩} |

*FIG. 37*

| A | $fid_/$ | 8:B | ents={*⟨$fid_{dir}$, "dir", 10:B⟩} |
| --- | --- | --- | --- |
| | $fid_{dir}$ | 10:A | ents={⟨$fid_{foo}$, "foo", 11:A⟩},<br>bptrs={⟨$fid_/$, "dir"⟩} |
| | $fid_{foo}$ | 11:A | bptrs={⟨$fid_{dir}$, "foo"⟩} |
| B | $fid_/$ | 8:B | ents={*⟨$fid_{dir}$, "dir", 10:B⟩} |
| | $fid_{dir}$ | 10:B | ents={}, bptrs={} |

*FIG. 38*

| | | | |
|---|---|---|---|
| A | $fid_/$ | 8:B | ents={*⟨$fid_{dir}$, "dir", 10:B⟩} |
| | $fid_{dir}$ | 10:A | ents={⟨$fid_{foo}$, "foo", 11:A⟩}, bptrs={⟨$fid_/$,"dir"⟩} |
| | $fid_{foo}$ | 11:A | bptrs={⟨$fid_{dir}$,"foo"⟩} |
| B | $fid_/$ | 8:B | ents={*⟨$fid_{dir}$, "dir", 10:B⟩} |
| | $fid_{dir}$ | 10:A | ents={⟨$fid_{foo}$, "foo", 11:A⟩}, bptrs={⟨$fid_/$,"dir"⟩} |

FIG. 39

| | | | |
|---|---|---|---|
| A | $fid_/$ | 13:A | ents={⟨$fid_{dir}$, "dir", 10:A⟩} |
| | $fid_{dir}$ | 10:A | ents={⟨$fid_{foo}$, "foo", 11:A⟩}, bptrs={⟨$fid_/$,"dir"⟩} |
| | $fid_{foo}$ | 11:A | bptrs={⟨$fid_{dir}$,"foo"⟩} |
| B | $fid_/$ | 13:A | ents={⟨$fid_{dir}$, "dir", 10:A⟩} |
| | $fid_{dir}$ | 10:A | ents={⟨$fid_{foo}$, "foo", 11:A⟩}, bptrs={⟨$fid_/$,"dir"⟩} |

FIG. 40

```
// Called every third night for every replica on the node.
proc GarbageCollection
    LiveNodes: $\mathbb{P}_1$ NodeID // Set of live nodes.
    r: Replica // Replica to be inspected.
    EXPIRE: integer // Dead-replica expiration period, e.g., a month.

// Remove old tombstones. Removing after EXPIRE seconds is safe
// because we cannot receive any new update with timestamp older
// than EXPIRE after removing r.
if ¬ IsLive(r) and r.ts < Newtimestamp - EXPIRE then
    DISK ← {r.fid} ◁ DISK
    return r' ← Deepcopy(r)

// Remove dead entries in the directory
if r' is a directory then
    for (key ↦ val): r'.ents •
        if ¬ val.valid and val.ts < Newtimestamp() - EXPIRE then
            r'.ents ← {key} ◁ r'.ents
    if at least one entry has been removed from r'.ents then
        r'.ts ← NewTimestamp()
        UpdateReplica(r)

// If some gold peers are found dead, recreate one elsewhere
if me ∈ r.gpeers and r.gpeers ⊄ Livenodes then
    newNodes ← Pick ‖r.gpeers \ Livenodes‖ random live nodes.
    r'.gpeers ← r.gpeers \ Livenodes ∪ newNodes
    r'.ts ← NewTimestamp()
    UpdateReplica(r)

// If we find graph edges to dead nodes, re-span it.
for n ∈ r.peers \ Livenodes
    Add edges between r and a random replica.
    r.peers ← r.peers ∩ Livenodes
```

*FIG. 41*

∀ f: ran(DISK) and IsLive(f) •
( ⟨d.fid, fname⟩ ∈ f.bptrs
  ⇒ d ∈ dom(DISK) and IsLive(d) )

FIG. 42

∀ d: ran(DISK) and IsLive(d) •
( f: ran(DISK) and IsLive(f) •
  (⟨d.fid,fname⟩ ↦ ent) ∈ d.ents and ent.valid
     and ⟨d.fid,fname⟩ ∉ f.bptr
  ⇒ ◊ ⟨f.fid,fname⟩ ↦ ent) ∉ d.ents )

FIG. 43

∀ d: ran(DISK) and IsLive(d) •
( ⟨f.fid,fname⟩ ↦ ent) ∈ d.ents and ent.valid
  ⇒ f: ran(DISK') and IsLive(f) )

FIG. 44

NAMESPACE CONSISTENCY FOR A WIDE-AREA FILE SYSTEM

RELATED APPLICATION DATA

This application is a continuation-in-part of U.S. application Ser. No. 10/315,583, filed Dec. 9, 2002, the entire contents of which are hereby incorporated by reference.

TECHNICAL FIELD

Embodiments of the present invention relate generally to distributed file systems, replication, membership protocols, mobile computing, nomadic computing, and/or peer-to-peer distributed systems.

BACKGROUND

Some examples of traditional distributed file systems include at least the following. NFS (Network File System) is a network file system designed for local area networks, and follows a client-server model. NFS relies on periodic polling to keep the cached data fresh. Thus, in a wide area network, NFS forces the clients to refresh data incessantly, thus rendering NFS as very inefficient. The availability of a file is limited by the availability of the server on which the file resides. Scalability is achieved by adding more servers and more volumes; the mapping of servers-volumes-namespace is manual.

AFS (Andrew File System) is a wide-area distributed file system that provides a unified file system under a single, global namespace. The wide-area system is organized in a number of "cells", with one cell in each physical location. Each cell comprises one or more servers. AFS utilizes persistent caching and callbacks. Write operations are flushed synchronously on the server. The "master copy" of a file resides on a single server. Thus, its availability (for open and write) depends on the availability of the server. Scalability is achieved by adding more servers and more volumes; the mapping of servers-volumes-namespace is semi-manual.

Coda adds to AFS two new modes of operations: "weakly connected" and "disconnected". In the case of disconnection or server failure, the client (transparently) switches to the disconnected mode and the user continues to read and write locally the cached files (that have been accessed before). However, the user cannot access files that have not been cached locally, and if the same files are updated by other clients, the changes are not visible to this client.

Roam, Ficus, and Bayou are three systems that aim at supporting mobile and/or often-disconnected users. Data are replicated on the local computer of the user. Data are synchronized with the other nodes/servers in the system, explicitly—either periodically or upon a user's request. CFS (Cooperative File System) is mostly a read-only file repository built in a peer-to-peer fashion. Data locations are chosen randomly (for availability and/or reliability) on a per-block basis. Each user owns a separate namespace, and updates to the namespace can be made only by that user. The design of CFS aims at reliability and load-balancing, but not at performance; multiple network hops may occur for each block access.

Oceanstore is a file repository, aimed to provide archival storage. Oceanstore implements a flat hash table on top of a peer-to-peer infrastructure, for placing file replicas; it employs an efficient and fault-tolerant routing algorithm to locate replicas. Locating and accessing a replica of a file may take many network hops.

Name services (such as Domain Name System, Clearinghouse, and Active Directory) use extensive caching to achieve high performance (i.e., low response latency). Data updates (e.g., changing a name zone) happen asynchronously, at the cost of less consistency across the system between cached and authoritative data. In these name services, there is no support of any file-like abstractions.

Thus, the current distributed file systems are limited in speed, availability, and/or network economy, and suffer from various constraints.

SUMMARY OF THE INVENTION

The invention is a system for and a method of maintaining namespace consistency in a wide-area file system. In one embodiment, a wide-area file system has a plurality of replicas for a file. Each replica of a file and parent directories for the file are at each of a plurality of nodes. An update to a replica of the file is propagated to other replicas of the file. In response to receiving a propagated update to a replica at a node, the replica for the file at the node is updated.

In another embodiment, a wide-area file system has a plurality of replicas for a file. Upon access of the file by a user at a node, parent directories for the file are replicated at the node and a replica of the file is formed at the node. The replica includes a backpointer having an identification of a parent directory for the file and a name of the file within the parent directory.

In yet another embodiment, a wide-area file system has a first type of file replica and a second type of file replica. Locations of replicas of the first type are registered in a parent directory for a file. Upon access of a file by a user at a node, the parent directory for the file is replicated at the node and a replica of the second type is formed at the node. The formed replica includes a backpointer having an identification of the parent directory for the file and a name of the file within the parent directory.

In a further embodiment, a system includes a plurality of nodes for storing replicas of files. For each replica at a node, the node stores parent directories for the file and a backpointer having an identification of a parent directory for the file. Updates to replicas of the file are propagated to other replicas of the file.

In further embodiments, a directory operation (e.g., rename, link or unlink) may affect a backpointer for a replica. When a backpointer for a replica at a node is not consistent with the parent directories for the replica at the node, the the parent directories are modified to be consistent with the backpointer. A modification may be performed at a node while an earlier inconsistent modification may be ignored. As a result, consistency is maintained among the replicas.

These and other aspects of the invention are described herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 shows a table showing the key attributes of a replica, in accordance with an embodiment of the invention;

FIG. 4 shows an example of algorithm description in accordance with an embodiment of the invention;

FIG. 5 shows notational conventions used in accordance with an embodiment of the invention;

FIG. 6 shows structure of a replica in accordance with an embodiment of the invention;

FIG. 7 shows relationships between the replica's attributes in accordance with an embodiment of the invention;

FIG. 8 shows shows persistent variables kept on each node in accordance with an embodiment of the invention;

FIG. 9 shows a listing of how a file is created in accordance with an embodiment of the invention;

FIG. 10 shows a listing of how removing a file may be implemented (e.g., by directory operation "unlink") in accordance with an embodiment of the invention;

FIG. 11 shows a listing of how hardlinking a file may be implemented (e.g., by directory operation "link") in accordance with an embodiment of the invention;

FIG. 12 shows a listing of how renaming a file may be implemented (e.g., by directory operation "rename") in accordance with an embodiment of the invention;

FIG. 13 shows a listing of how a file's contents may be updated (e.g., by file operation "write") in accordance with an embodiment of the invention;

FIG. 14 shows a listing of a central procedure, UpdateReplica, for fixing namespace inconsistencies in accordance with an embodiment of the invention;

FIGS. 16A-B illustrate and describe a protocol for adding a replica, in accordance with an embodiment of the invention;

FIG. 18 shows a listing of creation of a bronze replica when a node is asked to create a gold replica of a file, but it lacks the replica of file's parent directories, in accordance with an embodiment of the invention;

FIG. 19 shows a listing of a central procedure that fixes inconsistency between a file's backpointer and the corresponding directory entry;

FIG. 20 shows a listing of an algorithm for creating a bronze replica in accordance with an embodiment of the invention;

FIG. 21 shows a listing of an algorithm that may be used in conjunction with the algorithm of FIG. 20 to resurrect a dead directory and recreate an entry in its parent directory in accordance with an embodiment of the invention;

FIG. 22 shows an exemplary state of two replicas stored on a node A in a tabular form in accordance with an embodiment of the invention;

FIG. 23 shows exemplary consistent replicas in tabular form in accordance with an embodiment of the invention;

FIG. 24 shows exemplary replica states in tabular form after having been changed in accordance with an embodiment of the invention;

FIG. 25 shows exemplary replica states in tabular form after having been further changed in accordance with an embodiment of the invention;

FIG. 26 shows exemplary replica states in tabular form after having been further changed in accordance with an embodiment of the invention;

FIG. 27 shows exemplary replica states in tabular form after having been further changed in accordance with an embodiment of the invention;

FIG. 28 shows exemplary consistent replicas in tabular form in accordance with an embodiment of the invention;

FIG. 29 shows exemplary replica states in tabular form after having been changed in accordance with an embodiment of the invention;

FIG. 30 shows exemplary replica states in tabular form after having been further changed in accordance with an embodiment of the invention;

FIG. 31 shows exemplary replica states in tabular form after having been further changed in accordance with an embodiment of the invention;

FIG. 32 shows exemplary replica states in tabular form after having been further changed in accordance with an embodiment of the invention;

FIG. 33 shows exemplary consistent replicas in tabular form in accordance with an embodiment of the invention;

FIG. 34 shows exemplary replica states in tabular form after having been changed in accordance with an embodiment of the invention;

FIG. 35 shows exemplary replica states in tabular form after having been further changed in accordance with an embodiment of the invention;

FIG. 36 shows exemplary replica states in tabular form after having been further changed in accordance with an embodiment of the invention;

FIG. 37 shows exemplary replica states in tabular form after having been further changed in accordance with an embodiment of the invention;

FIG. 38 shows a directory having an orphan being recorded in ULOG in tabular form in accordance with an embodiment of the invention;

FIG. 39 shows a directory entry corresponding a missing backpointer in tabular form in accordance with an embodiment of the invention;

FIG. 40 shows an update for the missing backpointer in tabular form in accordance with an embodiment of the invention;

FIG. 41 shows a garbage collection algorithm for periodic recovery from permanent failures in accordance with an embodiment of the invention;

FIG. 42 shows a namespace containment property in accordance with an embodiment of the invention;

FIG. 43 shows a property by which a corresponding directory entry is eventually removed when a replica of the file does not have a backpointer to the directory in accordance with an embodiment of the invention;

FIG. 44 shows a property by which there exist live replicas of a file when a live directory replica contains a valid entry that points to the file in accordance with an embodiment of the invention.

DETAILED DESCRIPTION OF A PREFERRED EMBODIMENT

Figure 1:
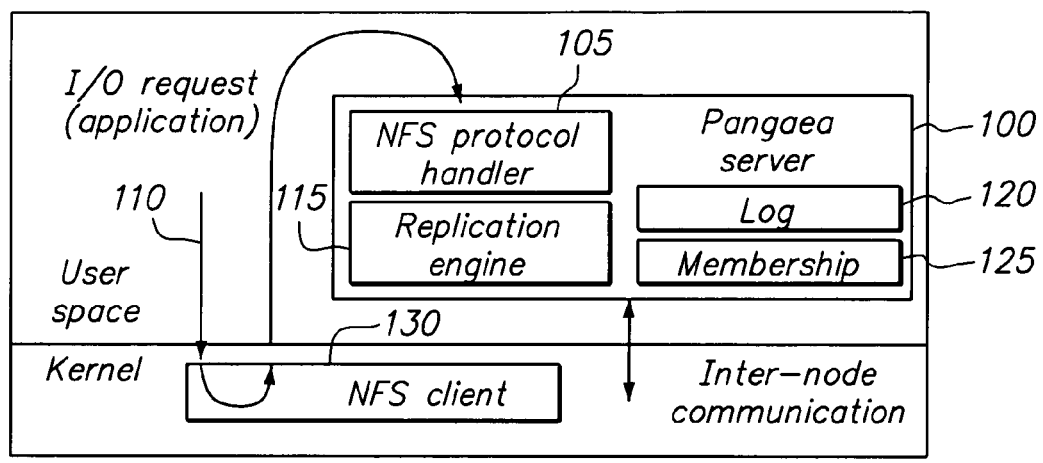
FIG. 1 shows a block diagram of a server, in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

1 Introduction

The invention relates to a wide-area file system (referred to herein as "Pangaea") that serves storage needs of multinational corporations or any distributed groups of users. Protocols for maintaining a hierarchical file system namespace are described herein. Pangaea is also described in U.S. application Ser. No. 10/315,583, filed Dec. 9, 2002, the entire contents of which are hereby incorporated by reference.

Pangaea is a wide-area file system that enables ad-hoc collaboration in multinational corporations or in distributed groups of users. This paper describes Pangaea's approach for keeping the file system's namespace consistent and proves its correctness. Maintaining the namespace is a simple matter in traditional file systems that store the entire volume in a single node. It is not so in Pangaea, which employs two key techniques to improve performance and availability in a wide area—pervasive replication that allows each file to be replicated on its own set of nodes on demand from users, and optimistic replication that allows two updates be issued on different replicas at the same time to improve availability. A naive implementation may leave some files without pathnames or some directory entries pointing to nonexistent files. To detect conflicting updates and inform all affected replicas about the resolution outcome reliably, Pangaea embeds a data structure called a backpointer in each file. A backpointer authoritatively defines the file's location in the file system's namespace. Conflicting directory operations are detected by a replica of the (child) file as a discrepancy in the value of the backpointer. The replica can then unilaterally resolve conflicts and disseminate the conflict resolution outcome to the parent directories.

1.1 Overview of Pangaea

Pangaea federates computers (e.g., provided by users of the system) to build a unified file system. To achieve high performance and availability in a wide area, Pangaea deploys two strategies not found in traditional replicated file systems: pervasive replication and optimistic replication.

1.1.1 Pervasive Replication

Pangaea aggressively creates a replica of a file or directory whenever and wherever it is accessed. Pangaea treats a directory as a file with special contents. Thus, the term "file" is sometimes used herein for both a regular file and a directory. This pervasive replication policy improves performance by serving data from a node close to the point of access, improves availability by naturally keeping many copies of popular data and letting each server contain its working set. This policy brings challenges as well: the set of nodes that replicate a file (called the replica set) can become different from that of its parent directory or siblings. Such situations complicate detecting and resolving conflicting directory operations, as is discussed further in Section 1.2.

1.1.2 Optimistic Replication

A distributed service faces two conflicting challenges: high availability and strong data consistency (see, Armando Fox and Eric A. Brewer. Harvest, yield, and scalable tolerant systems. In 6th Workshop on Hot Topics in Operating Systems (HOTOS-VI), pages 174-178, Rio Rico, Ariz., USA, March 1999. http://www.csd.uch.gr/markatos/papers/hotos.ps; and Haifeng Yu and Amin Vahdat, The Costs and Limits of Availability for Replicated Services, In 18th Symp. on Op. Sys. Principles (SOSP), pages 29-42, Lake Louise, AB, Canada, October 2001.) Pangaea aims at maximizing availability—it lets any user issue updates at any time to any replica, propagates the updates among replicas in the background, and detects and resolves conflicts after they happen. Pangaea thus supports "eventual" consistency, guaranteeing that changes made by a user are seen by another user only at some unspecified future time. More specifically, assuming that all nodes can exchange updates with one another, and users cease to issue updates for a long enough period, Pangaea ensures the following properties:

1. For every file, the state of all its replicas will become identical.
2. Every file has valid pathname(s).
3. No directory entry refers to a nonexistent file.

Section 7 defines these properties more formally and shows that a protocol described herein satisfies them.

1.2 Challenges of Replica Management in Pangaea

An optimistically replicated file system, Locus, was developed in early '80s (See, D. Scott Parker, Gerald Popek, Gerard Rudisin, Allen Stoughton, Bruce Walker, Evelyn Walton, Johanna Chow, David Edwards, Stephen Kiser, and Charles Kline. Detection of mutual inconsistency in distributed systems. IEEE Trans. on Software Engineering, SE-9(3):240-247, 1983; and Bruce Walker, Gerald Popek, Robert English, Charles Kline, and Greg Thiel. The LOCUS distributed operating system. In 9th Symp. on Op. Sys. Principles (SOSP), pages 49-70, Bretton Woods, N.H., USA, October 1983). The combination of pervasive replication and optimistic replication, however, adds a unique complexity to namespace management, because the system must maintain the integrity of the namespace across multiple files or directories replicated on different sets of nodes. Consider an example ("Example 1") in which file /foo and directories /alice and /bob are initially replicated on replica sets {A,B}, {A,C}, and {B,D}, respectively. Then, Alice on node A does mv /foo /alice/foo1 and, simultaneously, Bob on node B does mv /foo /bob/foo2, where "mv" is a directory operation for moving a file. When the dust settles, we want file foo to appear either at /alice/foo1 or at /bob/foo2, but not both. However, suppose that node A, on behalf of Alice, adds an entry for foo1 to /alice and sends the change to the replica on node C. If the final result is to move /foo to /bob/foo2, node C must undo the change, even though node C never receives Bob's update and cannot detect the conflict in the first place. Thus, a mechanism for forwarding conflict—resolution results to replicas that fail to detect conflicts is needed.

Removing a directory (e.g., by directory operation "rmdir") poses another challenge: a file under a removed directory may be updated by another node concurrently. Consider another example ("Example 2") in which an empty directory /foo is replicated on nodes (A, B). Alice on node A then creates file /foo/bar and Bob on node B does rmdir /foo. A naive implementation would remove /foo but leave file /foo/bar without a name. Another implementation would just delete /foo/bar when /foo is deleted, which at least keeps the file system consistent, but loses Alice's data. In this situation, the system must "revive" directory /foo if a live file is found underneath.

1.3 Overview of Pangaea's Replica Management Protocol

This section overviews Pangaea's four key strategies for addressing the aforementioned challenges. Essentially, a distributed file system like Pangaea can ensure eventual consistency when (1) there is at least one replica of a file that provides for detection of any conflicting pair of operations, (2) a conflict resolution decision is reliably propagated to all files affected by the conflict, and (3) replicas of each file make the same decision regarding conflict resolution. The first property is ensured using a data structure called backpointer, described in Section 1.3.1. The second property is ensured by two techniques, called namespace containment and directory resurrection, described in Sections 1.3.2 and 1.3.3. The final property is ensured by the use of a uniform timestamp-based conflict detection and resolution rule, described in Section 1.3.4.

1.3.1 Localizing Conflict Resolution Decisions Using Backpointers

Pangaea lets the "child" file have the final say on the resolution of a conflict involving directory operations. Note that conflicts may be resolved based on a specific file, but conflict resolution can occur at any of multiple nodes. For instance, in Example 1 above, if Bob's operation is to win over Alice's, a replica of file foo indicates that the replicas of /alice should have their change undone.

For this policy to work, each file must be able to determine its location in the file system namespace, unlike other file systems that let a directory dictate the location of children files. Pangaea achieves this by storing a special attribute, called backpointers, in each replica (a file usually has only one backpointer, unless it is hardlinked). A backpointer contains the ID of the parent directory and the file's name within the directory. Directory operations, such as "rename" and "unlink," affect the file's backpointer as they are implemented as a change to the file's backpointer(s). In Example 1 above, operation mv /foo /alice/foo changes file /foo's backpointer from (fid/, "foo") to (fidalice, "foo1")(fidx is the ID of the file x). When a replica receives a change to its backpointer, it also reflects the change to its parents by creating, deleting, or modifying the corresponding entries.

1.3.2 Name-Space Containment

Conflict resolution using backpointers requires that each file can discover a replica of the directory that the backpointer refers to. One approach is to embed pointers to at least some of the replicas of the parent directory in the backpointer (e.g., by embedding the gold-replica set of the parent directory—replica types, including "gold" and "bronze" are described herein) and modify the parent directory using remote procedure calls. This design has a drawback in that it may tend to be unwieldy: the backpointer is used to initiate a change in the directory, but its directory links must be changed when the directory's replica set changes. Because of this circular control structure, keeping the information of the backpointer and the parent directory properly synchronized is not easy.

This problem may be addressed by requiring that, for every replica of a file, its parent directories be also replicated on the same node. This property is referred to as namespace containment, because all intermediate pathname components of every replica are all replicated on the same node.

This policy improves Pangaea's availability and eases administration by allowing accesses to every replica on a node using ordinary file-access system calls, even when the node is disconnected from the rest of the system-i.e., it naturally offers the benefits of island-based replication (See, M. Ji, E. Felten, R. Wang, and J. P. Singh. Archipelago: an island-based file system for highly available and scalable Internet services. In USENIX Windows Systems Symposium, August 2000.) On the other hand, it increases the storage overhead of the system and adds a different sort of complexity to the protocol: every update to a replica potentially involves replicating its parent directories. A solution for maintaining the namespace containment property is described in Section 4.3. Storage overhead is discussed in Section 9.

A node must discover and replicate the root directory when starting the Pangaea service for the first time. The locations of the root replicas are maintained using a gossip-based distributed membership service (see Yasushi Saito, Christos Karamanolis, Magnus Karlsson, and Mallik Mahalingam. Taming aggressive replication in the pangaea wide-area file system. In 5th Symp. on Op. Sys. Design and Impl. (OSDI), Boston, Mass., USA, December 2002).

1.3.3 Avoiding File Losses by Resurrecting Directories

Pangaea addresses the problem of rmdir-update conflicts, shown in Example 2, by "resurrecting" deleted directories when necessary. When a node receives a request to create a replica for file F for which its parent directory, say D, does not exist (because it is "rmdir"ed by another concurrent update), the node schedules a special procedure to be called. The procedure is preferably called at a later time after a delay since the node may receive a second request to remove the file F in the near future. Similarly, the node schedules the procedure to be called when it deletes directory D with an entry to a live file F. This procedure, when executed, checks if F is still live and D is still dead; if so, it recreates D and adds F's entry to D. To resurrect a dead directory, when a node is requested to delete a replica, it removes the replica's contents but retains the last backpointer the replica has had. This "dead backpointer" determines the location in the namespace the directory is to be resurrected. This procedure potentially works recursively all the way up to the root, resurrecting directories along the way. For instance, if Bob on node B does rm -rf /a/b/c and Alice on node A does touch /a/b/c/foo simultaneously, then directories c, b, and a are resurrected in order to create a place for file foo.

1.3.4 Uniform Conflict Resolution Using Last-Writer—Wins Policy and Full-State Transfer Achieving eventual consistency requires that all replicas of a particular file make the same decision when confronted with a conflict. For the contents of a regular file, a version vector may be used (See, D. Scott Parker, Gerald Popek, Gerard Rudisin, Allen Stoughton, Bruce Walker, Evelyn Walton, Johanna Chow, David Edwards, Stephen Kiser, and Charles Kline. Detection of mutual inconsistency in distributed systems. IEEE Trans. on Software Engineering, SE-9(3):240-247, 1983) to detect conflicts and let the user fix the conflict manually.

Conflicts regarding the structure or attribute of the file system, such as backpointers or access permissions, are amenable to automatic resolution because of their well defined semantics. A combination of the "last writer wins" rule may be used (See, Paul R. Johnson and Robert H. Thomas. RFC677: The maintenance of duplicate databases. http://www.faqs.org/rfcs%-/rfc677.html, January 1976; and Robert H. Thomas. A majority consensus approach to concurrency control for multiple copy databases. ACM Trans. On Database Sys. (TODS), 4(2):180-209, June 1979) and full state transfer to resolve such conflicts. A high-level file system operation—e.g., write or unlink—is assigned a unique timestamp by the issuing node. When a replica discovers two conflicting updates, it picks the one with the newer timestamp and overwrites the older one (if the old update was already applied). With full state transfer, each update completely overwrites the contents and attributes of a replica. By applying the update with the newest timestamp, replicas will eventually converge to common state. Preferably, full-state transfer is performed during conflict resolution, whereas, deltas (i.e. changes in state) are used to reduce to update propagation overhead in the absence of conflicts.

A timestamp is generated using the node's real-time clock. Thus, using the last-writer-wins policy, the clocks of nodes must at least be loosely synchronized to respect the users' intuitive sense of update ordering. This is usually not a problem, as modern protocols (see e.g., David L. Mills, RFC1305: Network Time Protocol (NTP), version 3, http://www.faqs.org/rfcs/rfc1305.html, March 1992) can synchronize clocks within about 100 milliseconds even over a wide-area network.

1.4 Related Work

Many file systems replicate at a volume granularity and build a unified namespace by mounting a volume underneath another (e.g., Bruce Walker, Gerald Popek, Robert English, Charles Kline, and Greg Thiel. The LOCUS distributed operating system. In 9th Symp. on Op. Sys. Principles (SOSP), pages 49-70, Bretton Woods, N.H., USA, October 1983; James J. Kistler and M. Satyanarayanan. Disconnected operation in the Coda file system. ACM Trans. on Comp. Sys. (TOCS), 10(5):3-25, February 1992; and David H. Ratner. Roam: A Scalable Replication System for Mobile and Distributed Computing. PhD thesis, UC Los Angeles, 1998. Tech. Report. no. UCLA-CSD-970044). Because these systems need not support cross-volume directory operations, a single replica can locally detect and resolve conflicting updates. Pangaea, in contrast, replicates at a file or directory granularity to support wide-area ad-hoc collaboration. Pangaea must run a distributed protocol for namespace maintenance because every directory operation in Pangaea crosses a replication boundary.

Several file systems replicate data at a finer granularity. FARSITE (See, Atul Adya, William J. Bolosky, Miguel Castro, Ronnie Chaiken, Gerald Cermak, John R. Douceur, John Howell, Jacob R. Lorch, Marvin Theimer, and Roger Wattenhofer. FARSITE: Federated, available, and reliable storage for an incompletely trusted environment, In 5th Symp. on Op. Sys. Design and Impl. (OSDI), Boston, Mass., USA, December 2002) replicates at the unit of a "directory group", which resembles a volume, but with a dynamically defined boundary. It supports file renaming across directory groups using a Byzantine fault tolerant consensus protocol that coordinates nodes in a lockstep manner. Slice (See, Darrell C. Anderson, Jeffrey S. Chase, and Amin M. Vahdat. Interposed Request Routing for Scalable Network Storage. In 4th Symp. on Op. Sys. Design and Impl. (OSDI), pages 259-272, San Diego, Calif., USA, October 2000) replicates files and directories independently over a cluster of servers and uses two-phase commits to coordinate nodes. Pangaea, in contrast, coordinates nodes optimistically to improve availability and performance in a wide area, but it must detect and resolve conflicting updates.

Data structures similar to backpointers are used in several file systems. DiFFS (See, Zheng Zhang and Christos Karamanolis, Designing a robust namespace for distributed file services, In 20th Symp. on Reliable Dist. Sys (SRDS), New Orleans, La., USA, October 2001) places files and directories independently on a cluster of servers. It uses backpointers to implement at-least-once remote procedure calls (RPCs) for directory operation. DiFFS does not support replication. S4 (See, Armando Fox and Eric A. Brewer. Harvest, yield, and scalable tolerant systems, In 6th Workshop on Hot Topics in Operating Systems (HOTOS-VI), pages 174-178, Rio Rico, Ariz., USA, March 1999, http://www.csd.uch.gr/markatos/papers/hotos.ps) is a file system with a security auditing capability. It keeps a backpointer-like data structure to reconstruct a file's full path name from its inode number and chooses a security policy based on the path name. S4's backpointers are used only for auditing and not for replication.

1.5 Notational Conventions

FIG. 4 shows an example of algorithm description. UpdateReplica is the name of the procedure with one parameter, r2. Label "preconditions:" shows the condition that must be ensured by the caller, and label "postconditions:" shows the condition that this procedure ensures on return. A code block is demarcated by indentation, as in Occam or Python. Label "<3>" is a marker used to refer to the algorithm.

Several primitive functions may be used. Function Newtimestamp generates a globally unique timestamp. A timestamp is a tuple (clock, nodeid), where clock is the value of the real-time clock, and nodeid is the node that generated the timestamp. The latter value is used only to break ties. Function Newfileid generates a globally unique File ID. In practice, Pangaea uses a timestamp as a fileID. Thus, NewfileID is an alias for Newtimestamp. Function Deepcopy creates an object that is structurally identical to the old object but does not share memory with the old object. In addition, several mathematical symbols borrowed from the Z notation may be used (See, Michael Spivey. The Z notation: A Reference Manual. Prentice Hall, 1992. Online copy available at http://spivey.oriel.ox.ac.uk/mike/zrm/). FIG. 5 shows notional conventions used herein.

1.6 Definitions

The terms node and server are used interchangeably. Nodes are automatically grouped into regions, such that nodes within a region have low round-trip times (RTT) between them (e.g., less than approximately 5 milliseconds in one implementation). As used herein, the term "region" roughly corresponds to a geographical region. For example, if there is a group of computers in Palo Alto, Calif. and another group of computers in London, United Kingdom, then an embodiment of the system will recognize two regions. In practice, a "region" is defined in terms of physical proximity in the network (for example, computers that are in neighboring segments of the network or have low communication latency between them). Typically, this is also reflected in a geographic proximity as well. A server in an embodiment of the invention uses region information to optimize replica placement and coordination. A server in an embodiment of the invention replicates data at the granularity of files and treats directories as files with special contents. Thus, the applicants use the term "file" herein to refer to a regular file or a directory. It is noted that an embodiment of the invention treats a directory as a file with a special content. An "edge" represents a known connection between two replicas of a file; updates to the file flow along edges. The replicas of a file and the edges between the replicas comprise a strongly connected "graph". The set of replicas of a file is called the file's "replica set".

2 Structure of the Pangaea File System

As shown in FIG. 1, a server 100 according to an embodiment of the invention is implemented as a userspace NFS (version 3) loopback server. FIG. 1 shows a possible implementation of the server, and other implementations are possible. In one embodiment of the invention, a plurality of servers form a symbiotic wide area file system as discussed herein. In an embodiment, a server 100 includes four main modules (105, 115, 120 and 125) as discussed below.

An NFS protocol handler 105 receives requests 110 from applications, updates local replicas, and generates requests for a replication engine 115. The handler 105 may be built, for example, by using the SFS toolkit that provides a basic infrastructure for NFS request parsing and event dispatching. The SFS toolkit is described in, David Mazi'eres, A toolkit for user-level file systems, in *USENIX Annual Technical Conference*, Boston, Mass., USA, June 2001, which is hereby fully incorporated herein by reference.

The replication engine 115 accepts requests from the NFS protocol handler 105 and the replication engines 115 running on other nodes. The replication engine 115 creates, modifies, and/or removes replicas, and forwards requests to other nodes if necessary. The replication engine 115 is typically the largest part of the server 100.

In an embodiment of the invention, a replica is created by the replication engine 115 (FIG. 1) when a user first accesses a file, and a replica is removed by the replication engine 115 when a node runs out of disk space or the replication engine 115 finds a replica to be inactive. (An "inactive" replica is a replica that has not been accessed by the users on that node recently.) Because these operations are frequent, they are typically carried out efficiently and without blocking, even when some nodes that store replicas are unavailable.

A log module 120 implements transaction-like semantics for local disk updates via redo logging. A transaction is a collection of operations on the physical and abstract application state (see, Jim Gray and Andreas Reuter "Transaction Processing: Concepts and Techniques", Morgan Kaufmann Publishers Inc, 1993, which is hereby fully incorporated herein by reference). A transaction may involve operations in multiple nodes of a distributed system. By transaction semantics in the literature, those skilled in the art usually refer to four properties: Atomicity, Consistency, Isolation, and Durability. The server 100 logs all the replica-update operations using this service, allowing the server to survive crashes.

A membership module 125 maintains the status of other nodes, including their liveness, available disk space, the locations of root-directory replicas, the list of regions in the system, the set of nodes in each region, and a round-trip time (RTT) estimate between every pair of regions. It is noted that the replicas keep track of each other (those graph links as described herein). The replication engine typically handles at least two tasks:

(1) requests from the NFS protocol handler that need to be applied to the replicas of files, and (2) the replication engine coordinates with the replication engines on other nodes to propagate updates and perform other tasks. The replication engine uses the graph links associated with a local file replica to determine which nodes (and which replication engines associated with the nodes) to talk with regarding that file.

A remote node is live if it is functional (i.e., the remote node responds to requests from this node 100). Thus, the membership module 125 provides the information necessary to permit the replication engine 115 to make decisions on, for example, integration, updates, requests functions. In an embodiment, the membership module 125 runs an extension of van Renesse's gossip-based protocol, which is described in, Robert van Renesse, Yaron Minsky, and Mark Hayden, A gossip-style failure detection service, in *IFIP Int. Conf. on Dist. Sys. Platforms and Open Dist.* (Middleware), 1998, <http://www.cs.cornell.edu/Info/People/rvr/papers/pfd/pfd.ps>, which is hereby fully incorporated herein by reference. Each node periodically sends its knowledge of the nodes' status to a random node chosen from its live-node list; the recipient node merges this list with its own list. A few fixed nodes are designated as "landmarks" and they bootstrap newly joining nodes. The network administrator picks the landmarks and stores the information in a configuration file, which every server reads on startup. The protocol has been shown to disseminate membership information quickly with low probability of false failure detection. However, unlike an embodiment of the invention, Van Renesse's protocol did not have the notion of "regions", and did not keep round-trip time (RTT) estimates.

The region and RTT information is gossiped as part of the membership information. A newly booted node 100 obtains the region information from a landmark. The newly booted node 100 then polls a node in each existing region to determine where the polled node belongs or to create a new singleton region, where a singleton region is defined as a trivial region containing only the newly booted node 100. In each region, the node with the smallest IP (Internet Protocol) address elects itself as a leader and periodically pings nodes in other regions to measure the RTT. This membership-tracking scheme, especially the RTT management, is the key scalability bottleneck in an embodiment of the system; its network bandwidth consumption in a 10,000-node configuration is estimated to be approximately 10K bytes/second/node. An external RTT estimation services can be used, such as IDMaps, once they become widely available. IDMaps are described in, P. Francis, S. Jamin, C. Jin, Y. Jin, D. Raz, Y. Shavitt, and L. Zhang. IDMaps: A global Internet host distance estimation service. IEEE/ACM Trans. on Networking (TON), 9(5):525-540, October 2001, which is hereby fully incorporated herein by reference.

The NFS client 130 can process the I/O requests and responses between an application and the server 100. Typically, the NFS client 130 is located in the kernel, while the server 100 is located in the user space.

Figure 2:
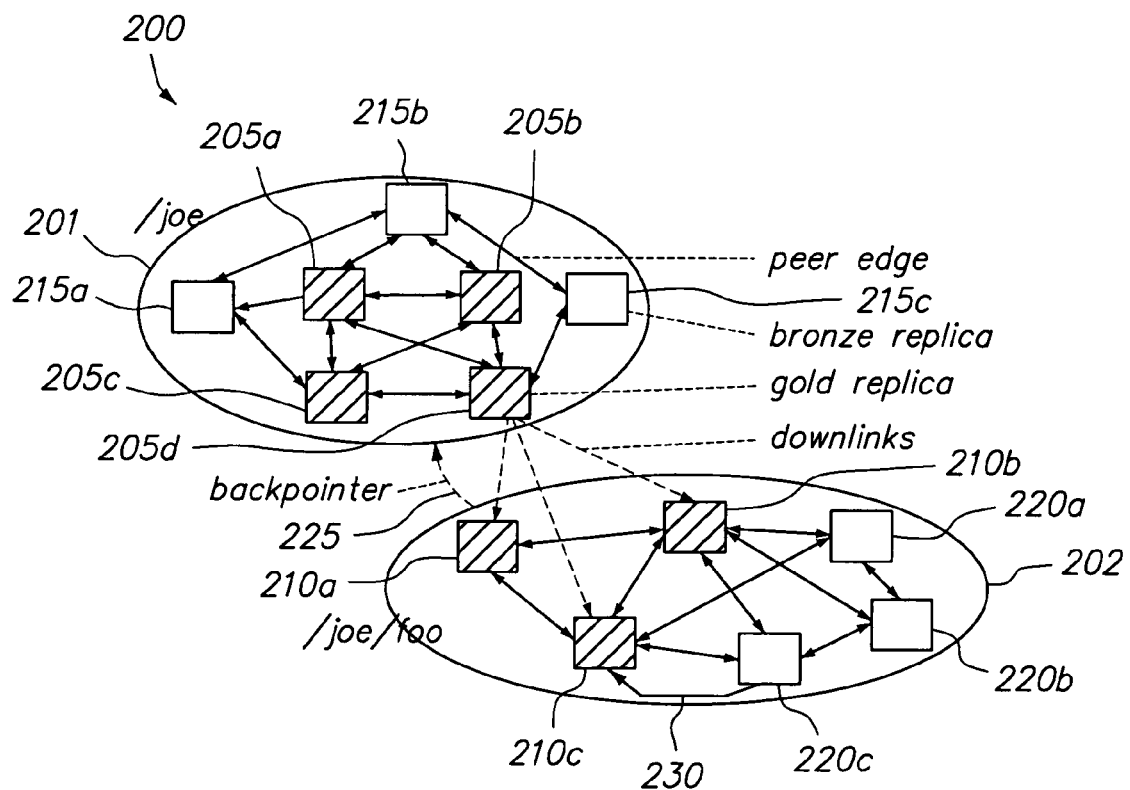
FIG. 2 shows a block diagram illustrating an example directory and file, along with gold and bronze replicas, in accordance with an embodiment of the invention.

FIG. 2 is an example of a directory /joe and file /joe/foo. Each replica of joe stores three pointers to the gold replicas of foo. Each replica of foo keeps a backpointer to the parent directory. Bronze replicas are connected randomly to form strongly connected graphs. Bronze replicas also have unidirectional links to the gold replicas of the file, which are not shown in FIG. 2.

In an embodiment, a server 100 decentralizes both the replica-set and consistency management by maintaining a distributed graph of replicas for each file. FIG. 2 shows an example of a system 200 with two files, i.e., directory /joe (210) and file /joe/foo (202). Pangaea creates replicas of a file whenever and wherever requested. The server 100 distinguishes two types of replicas: gold and bronze. For example, replicas 205a-205d and replicas 210a-210c are gold replicas, while replicas 215a-215c and replicas 220a220c are bronze replicas. The gold replicas and bronze replicas are alternatively referred to as core replicas and non-core replicas, respectively. The two types of replicas can both be read and written by users at any time, and they both run an identical update-propagation protocol. Gold replicas, however, play an additional role in maintaining the hierarchical namespace. First, gold replicas act as starting points from which bronze replicas are found during path-name traversal. To this end, the directory entry of a file lists the file's gold replicas (i.e., a directory points to gold replicas). Their locations are thus registered in file's parent directory. Second, gold replicas perform several tasks that are hard to perform in a completely distributed way. In particular, the gold replicas are used as pivots to keep the graph connected after a permanent node failure, and to maintain a minimum replication factor for a file. They form a clique in the file's graph so that they can monitor each other for these tasks.

Currently, a server 100 (see FIG. 1) designates replicas created during initial file creation as gold and fixes their locations unless some of them fail permanently. Each replica stores a backpointer (e.g., backpointer 225 in FIG. 2) that indicates the location of the replica in the file system namespace. A backpointer includes the parent directory's ID (identifier) and the file's name within the directory. It is used for two purposes: to resolve conflicting directory operations and to keep the directory entry up-to-date when the gold replica set of the file changes.

It is noted that a replica stores multiple backpointers when the file is hard-linked. A backpointer need not remember the locations of the parent-directory replicas, since a parent directory is always found on the same node due to the namespace-containment property.

The example of FIG. 2 illustrates a directory /joe (201) and a file /joe/foo (202). Each replica of joe stores three pointers to the gold replicas of foo. For example, the replica 205d is shown as having pointers to gold replicas 210a-210c of foo. Each replica of foo keeps a backpointer to the parent directory. For example, the replica 210a had a backpointer 225 to the parent directory /joe (201).

Bronze replicas are created in response to user demands. They are connected randomly to form strongly connected graphs. Bronze replicas also have unidirectional links to the gold replicas of the file, which are generally not shown in the drawings. For example, the bronze replica 220c has a uni-directional link 230 to the gold replica 210c and another uni-directional link to, for example, the gold replica 210b. The function of the unidirectional link from a bronze replica to the gold replicas is as follows. When some graph links disappear, then a new link must be created from doing a random walk starting from a gold replica. Thus, a bronze replica must know the location of the gold replicas. The replication engine 115 can determine the location of the gold replicas. To manage Bronze replicas cheaply and without a single point of failure, Pangaea builds a distributed graph of replicas independently for each file; a newly created replica joins the system by spanning edges to a few existing (gold or bronze) replicas. These edges are used both to discover the replica and propagate updates to the file. Pangaea provides reliable protocols for keeping the graph strongly connected and broadcasting updates efficiently over graph edges. These protocols are described in more detail in Yasushi Saito, Christos Karamanolis, Magnus Karlsson, and Mallik Mahalingam. Taming aggressive replication in the pangaea wide-area file system. In 5th Symp. on Op. Sys. Design and Impl. (OSDI), Boston, Mass., USA, December 2002.

A gold replica is arbitrarily chosen when the bronze replica is connected to that arbitrarily chosen gold replica.

The table in FIG. 3 shows the key attributes of a replica. The timestamp (ts) and the version vector (vv) record the last time the file was modified. GoldPeers are uni-directional links to the gold replicas of the file. Peers point to the neighboring (gold or bronze) replicas in the file's graph.

FIG. 6 shows the structure of a replica. The descriptions of the attributes follow:

<1> The globally unique ID of the file that the replica represents. The file ID is fixed once a replica is created.
<2> Graph edges to some bronze replicas of the file.
<3> The set of gold replicas of the file. The replica is gold if the node that stores the replica is in gpeers; otherwise, the replica is bronze.
<5> This field is either null, or it records the last backpointer the replica has had just before the file was deleted (Section 1.3.3).
<6> Shows the freshness of the replica (Section 1.3.4). The attributes in the replica, including gpeers and bptrs, are serialized by this timestamp.
<7> The contents of a regular file.
<8> Directory entries. An entry is identified by pair <fileid, filename>. That is, Pangaea allows duplicate filenames as far as they refer to different files. This design simplifies handling of the situation in which two users create two files with the same name. Section 8.1 discusses a strategy for presenting a more natural user interface on top of this design.
<9> Shows whether this entry is live. In Pangaea, deleted entries are not removed from the directory immediately. They are just marked invalid using this field and kept in the directory to disambiguate update/delete conflicts (i.e., invalid entries are used as death certificates)(see, Alan J. Demers, Daniel H. Greene, Carl Hauser, Wes Irish, and John Larson. Epidemic algorithms for replicated database maintenance. In 6th *Symp. on Princ. of Distr. Comp.* (PODC), pages 1-12, Vancouver, BC, Canada, August 1987).
<10> Shows the last time either bptrs or gpeers of the child file has changed. This timestamp is used to serialize other fields in Dentry.
<11> Points to the gold replicas of the child file.

The values of attributes fid, gpeers, ts, bptrs, and deadBptr will be the same on all replicas of a file in the absence of outstanding updates, but the value of peers differs between replicas, as it is used to construct the file's graph.

Two key attributes connect a file and its parent directories. Attribute gpeers <11> in the parent directory entry point to the file's gold-replica set <3> The backpointers of the file <4> point back to the parent directories. These attributes reciprocally link each other in the absence outstanding updates. FIG. 7 illustrates the relationships between the replica's attributes.

More particularly, FIG. 7 shows an example of a file system in which Directories /joe and /bob have the FileIDs of 50 and 53 respectively. A file with the ID of 55 is hard-linked to the two directories, one as /joe/bar and the other as /bob/foo. Attribute "ts=22:M" of /joe shows that this directory's timestamp is 22:M, i.e. it is issued by node M at time 22 (timestamps are generated using the node's real-time clock, but clock values are described herein as small integers for brevity). A circle around a letter indicates a gold replica. For instance, directory /joe has three gold replicas, on nodes M, O, and N. Arrows denote edges created through attributes gpeers and peers. Bronze replicas are not shown in this illustration, but the thin arrows emanating from the gold replicas indicate links to them.

FIG. 8 shows persistent variables kept on each node. DISK stores the set of replicas. CLOG records the set of replicas whose state may be inconsistent with other replicas of the same file. A replica stays in CLOG until all the neighboring replicas in the graph acknowledge its update. ULOG stores the set of files whose backpointers have changed but whose parent directories have not received the change. It maps a file ID to the set of backpointers deleted from the replica. Note that backpointers added to the replica need not be recorded in ULOG, as they can are stored from the replica's bptr.

3 High-Level Namespace Operations

This section describes the implementation of high-level namespace operations. The listing of FIG. 9 shows how a file is created. To create a file, a node must already store a replica of the parent directory (d). Otherwise, the node must create a new bronze replica of the directory by calling the procedures described in Section 4.3. This requirement applies to every directory operation described in this section. Procedure Create itself only creates a local replica of the file. A generic procedure UpdateReplica, described in Section 4, actually adds an entry to the parent directory and propagates the changes to other nodes.

Other namespace operations are implemented in a similar fashion. FIGS. 10, 11 and 12 implement removing ("unlink"), hardlinking ("link"), and renaming ("rename"), respectively. Additional operations may be implemented, for example, having different names or combined functions.

FIG. 13 shows how a file's contents can be updated (e.g., by "write"). Unlink does not delete the replica object even after its backpointers become empty. Attributes such as ts, peers, and gpeers are kept on disk so that it can reject stale updates that arrive in the future (e.g., because of message reordering) and resurrect the directory, if needed, to maintain the namespace's consistency (Section 1.3.3). A replica without a backpointer may be referred to as a "death certificate." Death certificates are removed by a background garbage-collection process that runs periodically (e.g., nightly), as described in Section 6.

4 NameSpace management and conflict resolution

FIG. 14 defines the central procedure, UpdateReplica, for fixing namespace inconsistencies. It is called by both local high level directory operations (Section 3) and remote update requests (FIG. 18). It takes new replica contents ($r_2$), copies them to the local replica, changes the parent directory entry if necessary, and schedules the update to be pushed to other replicas.

4.1 Propagating Updates

Procedure IssueCupdate, shown in FIG. 18, propagates a change to other replicas of the same file ("C" stands for "contents"). A basic propagation mechanism that transfers the entire replica state, even when just a byte is modified is described herein. Two alternate techniques, delta propagation and harbingers, that reduce the update propagation overhead, are described in U.S. application Ser. No. 10/315,583, filed Dec. 9, 2002.

Updates are propagated to other replicas periodically in the background by PropagateCupdate. Processing a remote update is similar to applying a local update: the local replica is updated, if needed, and the change is forwarded to the neighboring replicas in the file's graph. The only difference is that the receiving site must ensure the name-space containment property (Section 1.3.2) before applying the update. The node thus replicates all intermediate directories in the file's path by calling CreateReplica recursively, as described in Section 4.3. While updates are preferably propagated by neighboring replicas according to the graph, it will be apparent that another technique can be used for propagating the updates.

4.2 Repairing namespace inconsistencies

Procedure IssueUupdate is called by UpdateReplica when a file's backpointer is possibly inconsistent with the corresponding directory ("U" stands for "uplink"). This procedure only logs the request for later execution. Procedure ProcessUupdate actually updates the parent directory to match the file's backpointer. On exit, this procedure guarantees that there is a directory entry for every backpointer, and that there is no entry in directories to which the file lacks backpointers.

A time period should elapse before files added to ULOG are treated by ProcessUupdate, because executing it immediately will tend to waste both the disk and network bandwidth and sometimes undo the update against the user's expectation. Section 8.2 discusses this problem in more detail and discloses a technique for choosing the waiting period.

4.3 Creating a Replica

The protocol for creating additional replicas for a file is run when a user tries to access a file that is not present in the local node of the user. For example, suppose that a user on node S (e.g., server 400 in FIG. 15) wants to read file F. A read or write request is always preceded by a directory lookup (during the open request) on node S. Thus, to create a replica, node S must typically replicate the file's parent directory. This recursive step may continue all the way up to the root directory. The locations of root replicas are maintained by the membership service 125 (FIG. 1).

In sum, when a process attempts to open a file on a node, it performs a lookup operation to obtain a reference to the file. Here, this is a reference to a local replica of the file. To do that, and if there is no local replica of the file already, the node locates the parent directory of the file; from the corresponding directory entry, it locates the golden replicas of the file; starting from the golden replicas, it traverses the existing graph for that file, to locate a replica (golden or bronze) that is close-by (in network terms) and then copies the contents of that replica to create a local (bronze) replica. The process is repeated recursively all the way up the pathname of the file, if necessary. In the extreme case, the recursion is terminated at the root ("/") directory, whose location is well-known to all nodes in the system or can be retrieved from the membership service.

In an embodiment, the server 400 performs a short-cut replica creation to transfer data from a nearby existing replica. To create a replica of file F, node S first discovers the file's gold replicas in the directory 410 entry during the pathname lookup. Node S then requests the file contents from the gold replica closest to node S (e.g., say gold replica P (417) on server 450). Gold replica P then finds a replica closest to node S among its own graph neighbors (e.g., say replica X (418) on server 455, which may be gold replica P itself) and forwards the request to replica X, which in turn sends the contents to node S. At this point a replica 405 of file F has been created on node S and node S replies to the user and lets the user start accessing the local replica of F (via client 425).

This request forwarding is performed because the directory only knows file F's gold replicas, and there may be a bronze replica closer to gold replica P than the gold ones.

The new copy is integrated into the file's replica graph to be able to propagate updates to and receive updates from other replicas. Thus, in the background, node S chooses m existing replicas of F (where m is a parameter with a value that can vary), adds edges to them, and requests the m existing replicas chosen by node S to add edges to the new replica in node S. The replication engine 115 performs the above integration, updates, requests functions. The selection of m peers typically must satisfy three goals:

Include gold replicas so that they have more choices during future short-cut replica creation.

Include nearby replicas so that updates can flow through fast network links.

Be sufficiently randomized so that, with high probability, the crash of nodes S does not catastrophically disconnect the file F's graph.

Figure 15:
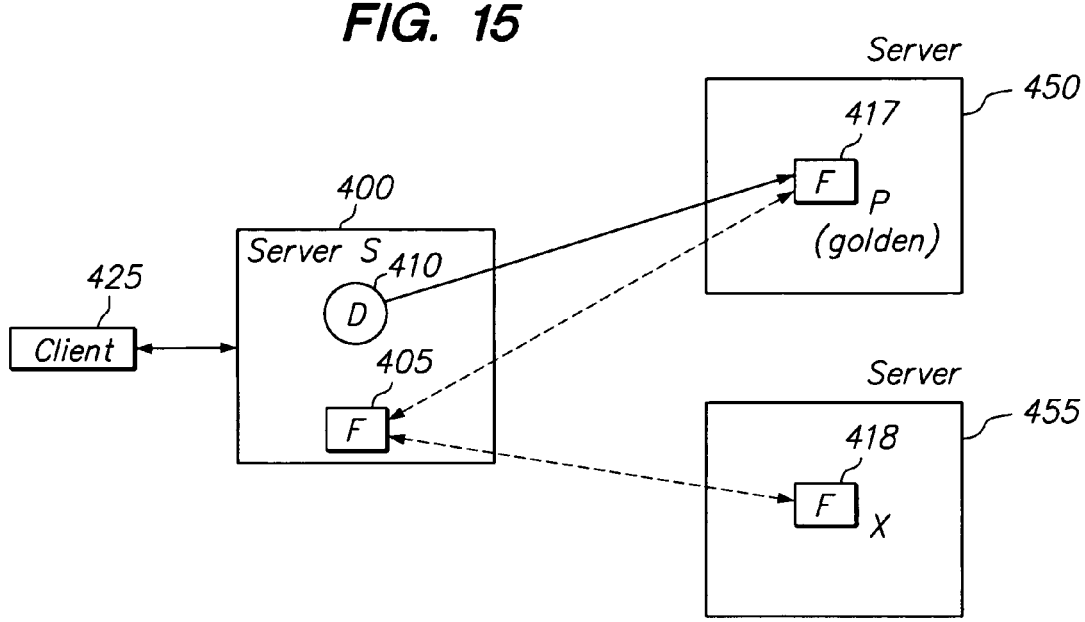
FIG. 15 shows a block diagram of a method of replication, in accordance with an embodiment of the invention.

The node S (400) satisfies all these goals simultaneously, as a replica can have multiple edges. Typically, the node S (via replication engine 115) chooses three types of peers for the new replica. First, node S adds an edge to a random gold replica, preferably one from a different region than node S, to give that gold replica more variety of regions in its neighbor set. Second, node S asks a random gold replica, say e.g., gold replica P (417) on server 450, to pick the replica (among gold replica P's immediate graph neighbors) closest to node S. The replication engine 115 in server 450 will perform the function of picking the replica closest to node S (among gold replica P's immediate graph neighbors). In the example of FIG. 15, the gold replica X (418) on server 455 is determined and picked as the replica closest to node S. Third, node S asks gold replica P to choose m-2 random replicas using random walks that start from gold replica P and perform a series of RPC (Remote Procedure Calls) calls along graph edges. This protocol ensures that the resulting graph is m edge- and node-connected, provided that it was m-connected before.

FIGS. 16A-B below illustrate and describe a protocol for adding a replica, in accordance with an embodiment of the invention.

Parameter m trades off availability and performance. A small value increases the probability of graph disconnection (i.e., the probability that a replica cannot exchange updates with other replicas) after node failures. A large value for m increases the overhead of graph maintenance and update propagation by causing duplicate update delivery. The applicants have found that m=4 offers a good balance in a prototype of an embodiment of the invention.

Figure 17:
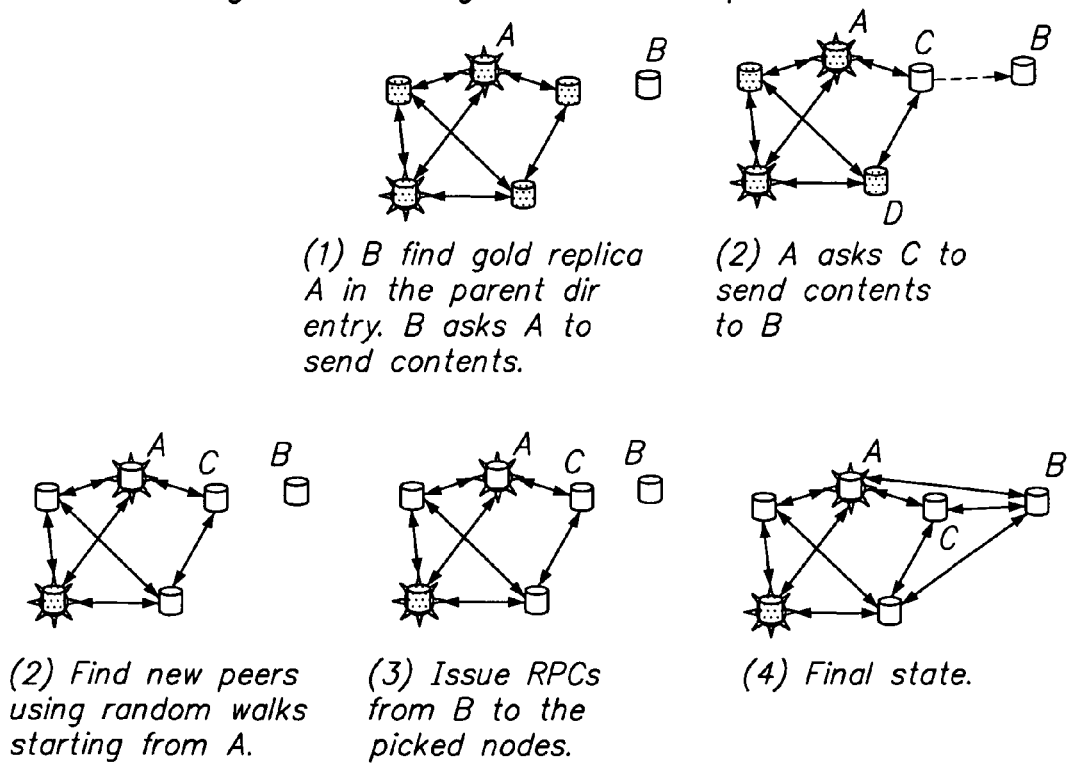
FIG. 17 shows block diagrams of a method of creating a bronze replica, in accordance with an embodiment of the invention.

As shown in FIG. 17, a bronze replica is created based on the following method. When a node B needs to create a local replica of a file X (e.g., because a local user tries to access the file X), node B already has a local replica of the parent directory of file X, say parent directory Y. This happens through the recursive lookup process for locating the file. So, B knows what are the gold replicas of X (they are listed in file X's entry in directory Y). Say one of the gold replicas of file X is on node A. Node B contacts node A to send the contents of file X. Node A, in turn, may ask node C which closer to node B and also has a replica of file X to send the contents of file X. The new replica of file X on node B is then connected to the pre-existing replicas of file X on node A and node C. RPCs are issued from node B to picked nodes A and C, in order to obtain a final state.

Pangaea dynamically creates a bronze replica on two occasions. First is when the user accesses a file on a node for the first time. Second is when the node is asked to create a gold replica of a file, but it lacks the replica of file's parent directories (FIG. 18). FIG. 19 shows the central procedure that fixes inconsistency between a file's backpointer and the corresponding directory entry. FIG. 20 describes the algorithm for creating a bronze replica. Procedure CreateReplica works recursively from the given directory and ensures that all intermediate directories, up to the root directory, are replicated locally. It does not, however, guarantee that these files are live (i.e., has a nonempty backpointer) or that each directory has an entry that correctly points to the child. ResurrectDirectory, described in Section 4.4, ensures these properties.

4.4 Resurrecting Directories

Both c- and u-update processing (FIGS. 18 and 19) requires that a file's parent directories are live and with valid pathnames. Procedure ResurrectDirectory, shown in FIG. 21, is used in conjunction with CreateReplica to resurrect a dead directory and recreate an entry in its parent. This procedure is also recursive—it ensures that all the intermediate directories also are live and with valid pathnames.

5 Examples of Conflict Resolutions

This section describes how Pangaea resolves several common types of conflicts. A tabular form is used, shown in FIG. 22, to display the state of the system. The example of FIG. 22 shows the state of two replicas stored on node A. Label fid/ represents the file ID of the replica of the directory initially located at "/". Replica fid/ has the timestamp <6> of 5:A, and its entries contain directory "alice" at fid alice, with timestamp 12:A. A directory entry marked "*" is invalid (i.e., ent.valid=false in FIG. 6).

5.1 Scenario: Rename-Rename Conflict

Let us first revisit Example 1. We just show state transitions on nodes A and B, as nodes C and D only passively receive updates from nodes A and B. Initially, the replicas are consistent as shown in FIG. 23. Then, Alice does mv /foo /alice/foo1, as shown in FIG. 24. Bob does mv /foo /bob/foo2, as shown in FIG. 25. Let us assume node B's node ID is larger than A's; that is, timestamps are ordered in the following manner: 12:B>12:A>11:B>11:A.

Node B sends the update to file fidfoo to node A. Node A first replicates directory /bob (by copying the state from node B) to ensure the namespace containment property (FIG. 18). Node A then changes replica fidfoo's backpointer and removes the fidfoo's entry in /alice, as shown in FIG. 26.

Node A sends update to file fid/ to B. Node B applies the change, but it actually leaves the directory's contents intact. Node A also sends update to file /foo to B, but B discards the update, because B already has applied this update. In the end, the file /foo will move to /bob/foo2. The state of the nodes appears as in FIG. 27.

5.2 Scenario: Delete-Update Conflict

In this example, directory/and file /foo are both initially replicated on two nodes, {A, B}. Alice on node A deletes /foo, while Bob on node B edits and updates /foo.

Initially, all the replicas are consistent, as shown by FIG. 28. Alice then deletes file /foo, as shown by FIG. 29, and Bob edits file /foo, as shown by FIG. 30.

Consider two cases, depending on whose update timestamp is larger.

Case 1: 11:B>11:A: The update for file fidfoo is sent from node B to A. Node A revives file fidfoo and schedules procedure ProcessUupdate to be called. This procedure will revive fidfoo's entry in directory fid/. The change to fid/ is sent to node B, which accepts it, as shown in FIG. 31.

Case 2: 11:A>11:B: Node B's update to fidfoo is sent to A, but is ignored. Node A's update to fidfoo is sent to B. Node B removes fidfoo and its entry in fid/. B sends its update to/back to A. In the end, the file is removed from both nodes so that the states of the nodes appear as in FIG. 32.

5.3 Scenario: rmdir-Update Conflict

This section shows how Pangaea resolves Example 2. Initially, the replicas are consistent, as shown in FIG. 33. Then, Alice creates file /foo/bar, as shown in FIG. 34. Bob removes directory fidfoo, as shown in FIG. 35.

Consider two cases, depending on whose update timesstamp is larger.

Case 1: 11:B>11:A>10:B>10:A: Updates to fid/ and fiddir are sent from node B to A. Node A deletes /dir but notices that file fidfoo has become an orphan and puts it in ULOG (FIG. 19). The states of the nodes then appear as in FIG. 36. Update to fiddir is sent from node A to B, but is ignored by B. Later, node A runs ProcessUupdate. A resurrects directory fiddir. The update for fiddir is sent to node B, and B applies this update. The final state on both the nodes will become as shown in FIG. 37.

Case 2: 11:A>11:B>10:A>10:B: The update to fid/is sent to A, which accepts it. The update to fiddir is sent to A, which rejects it. At this moment, A will notice that directory fiddir has an orphan and puts fiddir in ULOG. This is shown in FIG. 38. The update to fiddir is sent from node A to B, which it accepts. Node B puts fiddir in ULOG, because the directory entry corresponding to fiddir's backpointer is missing, as shown in FIG. 39. Node A fixes the inconsistency between fiddir and fid/. A sends the update to fid/ to B. This is shown in FIG. 40.

Thus, multiple updates are performed according to the order in which they occur. As a result, an earlier inconsistent modification may be ignored in a favor of a later-occurring one. This maintains consistency among the replicas.

6 Periodic Recovery and Garbage Collection

The protocol described so far generally does not remove the replica object even after Unlink-it removes the replica contents but keeps attributes, such as ts, gpeers, and deadBptr, as death certificates. Death certificates must be removed eventually, or the disk will become filled with junk. Pangaea runs a garbage-collection module periodically (every three nights by default) to improve the "health" of the system by culling old tombstones and mending a file's replica graph. FIG. 41 shows a garbage collection algorithm for periodic recovery from permanent failures. In accordance with this algorithm, a failure detection service supplies the list of live nodes in variable LiveNodes.

A reliable failure detection is assumed. Specifically: (1) a node's permanent death can accurately be detected (all live nodes, within a fixed time period, agree on which nodes have died permanently); (2) if, for any reason, a node declared permanently dead (by other nodes) comes back, it must wipe the disk out, assume a new node ID, and join the system from scratch.

In practice, these conditions can easily be satisfied. One solution is simply to have the system administrator declare a node's decommissioning manually. Alternatively, standard heartbeat techniques can be used with an extremely large timeout value, such as a month; the usual cause of inaccurate failure detection, such as network partitioning and slow nodes, cannot persist for a month in practice. The second condition can be maintained by node checking its clock on reboot and reinitializing itself if it has been down for longer than a month.

7 Correctness

Pangaea's consistency guarantee is described informally in Section 1.1: (1) the state of all replicas of a file converges, (2) every file has a valid path name, and (3) no directory entry points to a nonexistent file. Notice that executing high-level operations (e.g., Unlink) is not guaranteed to actually produce the results expected by the user. Such a guarantee is ultimately impossible when conflicts happen. Moreover, the inventive protocol may undo a rmdir operation on rare occasions to maintain the consistency of namespace operations (Section 1.3.3). Pangaea does try to minimize the possibility of lost updates by letting nodes wait in certain situations, as discussed in Section 8.2.

Criterion (1) is ensured when all replicas of a file receive every update and make identical decisions regarding conflicts. That every replica receives every update is ensured by an updateflooding protocol described in U.S. application Ser. No. 10/315,583, filed Dec. 9, 2002. The use of CLOG guarantees that update propagation is fault tolerant. That replicas make identical decisions is guaranteed by having a replica's state identified by a globally unique timestamp <6>, and by having all replicas pick the update with the largest timestamp <16>.

In the following, recall that by "live" replica what is meant is that it has a nonempty list of backpointers or that it is a replica of the root directory. By "a valid entry" what is meant is that the entry is valid for a period of time that depends upon the circumstances.

Criteria (2) and (3) can be proven using the following properties:

(i) If a file replica is live, then there is a live local replica of every directory referenced by a valid backpointer of the file replica (namespace containment). This property is represented in FIG. 42.

(ii) If a directory points to a file and a replica of the file does not have a backpointer to the directory, then eventually the corresponding directory entry is removed. This property is represented in FIG. 43.

(iii) If a live directory replica contains a valid entry that points to a file, then there exist live replicas of the file. This property is represented in FIG. 44. The namespace containment property (property (i), above) implies that every file with live replicas has a valid path name—it is eventually referenced by directories with replicas on the same nodes as the file replicas. Thus, criterion (2) holds. Properties (ii) and (iii) state that directory entries and backpointers are eventually mutually consistent—a directory entry exists if and only if there exist live replicas of a file that have back pointers to the directory. Thus, criterion (3) also holds.

Proof of property (i): A change to the backpointer is initiated by high-level directory operations (Section 3) or by remote up date processing (FIG. 18).

The precondition of the user-initiated operations (e.g., condition <13> in FIG. 9) demands that the target directory be locally stored and live. Thus, when a backpointer is created in some replica by one of these operations, a local replica of the directory already exists.

Remote update processing specifically creates all the parent directories of the new replica contents using CreateReplica and ResurrectDirectory before calling UpdateReplica. Thus, when the backpointer is created, a local replica of the directory already exists.

Proof of property (ii): Assume that file f is pointed to by a valid entry d.ents of directory d, but there is no backpointer from a replica of f back to d.

This is possible when the backpointer is removed. There are two cases where the backpointer is removed, while a directory entry still exists.

Case 1: During an unlink operation (or the unlink part of a rename operation), the backpointer of the file replica is removed before UpdateReplica is called (FIG. 14). IssueCupdate propagates the backpointer removal to the other replicas of the file <19>. Criterion (1) guarantees that the corresponding update is disseminated to all file replicas. Any backpointer changes are also recorded in ULOG. ProcesUupdate eventually processes every record of ULOG and any backpointer removals are reflected on the local directory replica, i.e., the corresponding entry is removed. The new directory entries are propagated to the other directory replicas through Issue-Cupdate. Criterion (1) again guarantees that the corresponding up-date is disseminated to all directory replicas.

Case 2: When a potential conflict with the backpointers is detected and resolved <17>. Similarly to case 1, IssueUupdate records the resolved backpointer change (which may remove a backpointer) in ULOG. When the ULOG is processed, any removed backpointers are reflected on removed entries in the replicas of the corresponding directories.

In any case where a backpointer is created (Create, Link, Rename, CreateReplica), the backpointer is thus preferably created before the corresponding directory entry.

Proof of property (iii): If there was no live replica of the file, that means that there would be no backpointer corresponding to this directory entry. Given property (ii), the directory entry would have been eventually removed from all directory replicas. Thus, for the directory entry to remain valid, there must be at least one active file replica that has a backpointer to the file and that backpointer prevails any potential conflict resolutions. Eventually, the backpointer becomes valid in all replicas of the file.

8 Implementation Considerations 8.1 Implementing Directories

Directory entries in Pangaea are identified by a tuple, <FileID, filename>, to simplify conflict resolution (Section 2). This design raises two issues. First, it may be slow if implemented naively, because most directory operations find files by names. Second, it must let the user distinguish two different files with the same name.

The first problem is solved by implementing a directory as a mapping from a string (filename) to a set of directory entries. In absence of conflicting updates, a single filename is mapped to a single entry, achieving the same level of efficiency as the traditional file system's.

The second problem is solved by converting filenames during a directory-scanning request (readdir). When Pangaea finds a filename with multiple entries during readdir, it disambiguates them by appending (a textual representation of) their file IDs. For example, when filename foo is shared by two entries, one for a file with ID of 0x83267 and another with ID of 0xa3c28, the user will see two filenames, foo@@83267 and foo@@a3c28. Future file-related system calls, such as open and rename, will locate a unique entry from given one of these filenames. The separator between the original filename and the suffix ("@@") should be a string that usually does not appear in a filename-otherwise, a user cannot create a file with a name that contains the separator.

8.2 Choosing Uupdate Timeout Periods

ProcessUupdate is the central procedure that fixes inconsistency between a file's backpointer and the corresponding directory entry. For two reasons, it is a good idea to wait before fixing the inconsistency. Immediate execution often results in a storm of updates.

When namespace inconsistency is found, ProcessUupdate will be scheduled on every node that replicates that file. If executed immediately, these nodes will broadcast the same resolution result to one another, thereby wasting the disk and network bandwidth. By adding a random delay, however, there is a high chance that one replica resolves the problem and tells other replicas to accept the resolution. On all other replicas, when ProcessUupdate runs, it merely confirms that the namespace is consistent and exits.

For instance, suppose that file /foo/bar is replicated on nodes {A, B}, and Alice on node A deletes file /foo/bar. Node A pushes the update to bar to node B, and node B puts the file's replica in ULOG. In this situation, node B should wait for some period and let node A execute ProcessUupdate, update /foo, and propagate the change to B.

Immediate execution may undo an operation against the user's expectation. IssueUupdate is called when a directory is removed, but some live files are found under it (steps <15> and <18>). For example, suppose that directory /foo and file /foo/bar are replicated on nodes {A,B}, and Alice on node A does rm rf /foo. The update to /foo may arrive at node B before the update to bar, in which case node B will register /foo in ULOG (because file bar is still live). If node B executes ProcessUupdate before receiving the update to foo, it will end up undoing Alice's change. Rather, node B should wait for awhile, in the hope that update to bar will arrive during the wait.

On the other hand, delaying executing ProcessUupdate for too long will prolong the state of inconsistency. Thus, the following guidelines are set for the waiting period.

For a change that happens as a direct result of local file system operations, ProcessUupdate should be executed immediately, because the user expects that. In particular, procedures Create, Unlink, and Rename all calls UpdateReplica, which in turn call IssueUupdate. In these situations, ProcessUupdate should be executed immediately.

For IssueUupdate called as a result of remote update, ProcessUupdate should wait for fairly long, e.g., 3 minutes.

9 Assessing Pangaea's Storage Overhead Due to Namespace Containment

The namespace containment property increases the storage demand by forcing each node to store directories that it will not actually use. This section evaluates the overhead of this requirement.

Due to the lack of wide-area file system trace, a Redhat Linux distribution (workstation version 7.3) is obtained and the storage overheads of the system are analyzed statically, assuming that a distributed group of users stores the Redhat7.3 files in Pangaea servers. The storage overhead is measured by the percentage of 512 byte disk blocks used by directories, averaged over all nodes in the system. The storage overhead is determined by four parameters:

Number of gold replicas per file. When a user creates a file, a fixed number of gold replicas are placed on nodes chosen semi-randomly. A node may therefore store a gold replica without its local users never accessing it. For each gold replica, all the intermediate directories in its path must also be replicated on the same node. Having more gold replicas will thus increase the space overhead. This parameter is varied from two to four.

Gold-replica placement policy. Two policies are experimented with. The random policy chooses gold-replica sets for each file or directory uniformly randomly. The dir policy chooses gold-replica sets uniformly randomly for a directory, but for regular files in the directory, it chooses the set the same as the directory's. This policy, similar to Archipelago's (See, M. Ji, E. Felten, R. Wang, and J. P. Singh. Archipelago: an island-based file system for highly available and scalable Internet services. In USENIX Windows Systems Symposium, August 2000) and Slice's (See, Darrell C. Anderson, Jeffrey S. Chase, and Amin M. Vahdat. Interposed Request Routing for Scalable Network Storage. In 4th Symp. on Op. Sys. Design and Impl. (OSDI), pages 259-272, San Diego, Calif., USA, October 2000), helps directories to be concentrated on fewer nodes and lower the space overhead.

Average number of bronze replicas per file. Bronze replicas impose the same storage overhead as gold replicas. Bronze replicas, however, are created only when the users wants to access it, and some access locality that improves the storage overhead can be expected. The locality issue is discussed below. This parameter is varied from 0 to 100.

Degree of file access locality. In general, some locality in the file access pattern of a user can be expected. In other words, when a user accesses a file, he or she will also access other files in the same directory. This behavior can be modeled via the degree of file access locality. For example, if the value of this parameter is 10%, then 10% of files in a directory are stored on the same node as bronze replicas. This parameter is varied from 10% to 100%.

The storage overhead is independent of the number of nodes or users in the system, as an additional node will only increase the size of directories and files proportionally. As it stands, Redhat7.3 stored on a local file system-i.e., the one-gold-replica, zero-bronze-replica configuration-uses 0.3% of the disk blocks for directories; this configuration sets the lower bound.

Figure 45:
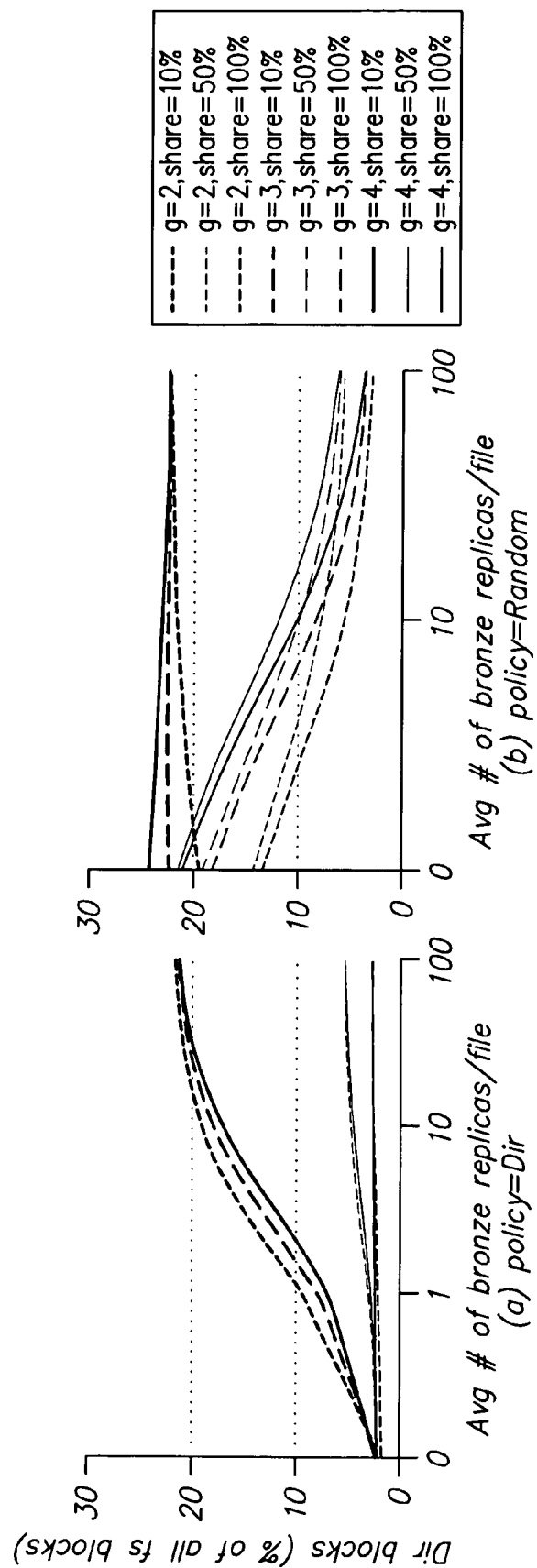
FIG. 45 shows a percentage of disk space occupied by directories as results of analysis in accordance with an embodiment of the invention.

FIG. 45 shows the result of analysis. More particularly, FIG. 45 shows a percentage of disk space occupied by directories. The label "G=" shows the number of gold replicas and Label "share=" shows the degree of access locality. Graph (a) shows the storage overhead with the "dir" placement policy. When the number of bronze replicas is small, all the configurations have storage overhead of about 2%. The number of gold replicas plays little role here, because most of the directories will be shared by files below them in the namespace. As the number of bronze replicas grow with low access locality, the overhead grows, since that forces nodes to create a separate directory hierarchy for each replica.

Graph (b) shows storage overhead with the "random" placement. Overall, the random placement shows higher overhead than "dir" placement, since it forces replicating many directories used only to look up the replica of a single file. As more bronze replicas are created, the overhead will be determined by their number and access locality, because the storage space will be dominated by bronze replicas.

Overall, the system uses at most 25% more space than the optimal. Given that using 2×to 4×more space to replicate files may be acceptable, it is believed that additional 25% of overhead is reasonable. However, the system should try to consolidate the placement of gold replicas from the same directory, since it dramatically lowers storage overhead with no adversarial side effect.

10 Conclusion

A system and method for maintaining the consistency of the file system's namespace has been described. Because Pangaea adopts a pervasive and optimistic replication policy, it runs a distributed protocol to inform the conflict resolution decision by one replica to its parent directories.

Backpointers are embedded in each file to define its position in the namespace authoritatively. Directory operations do not directly modify directory entries-they merely change the file's backpointer and let a generic conflict resolution routine to reflect the change back to the directory. This protocol is expected to guarantee the consistency of the file system-namely, that all replicas of a file become identical, each file has a valid path name, and every directory entry points to a valid file.

For every file, all intermediate directories up to the root directory are stored on the same node. Overhead caused by this requirement is expected to be somewhere between 3% and 25%. Because using 2×to 4×more space to replicate files may be acceptable, it is believed that using additional 25% of space is reasonable.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a wide-area file system, including a plurality of nodes storing replicas of objects, the objects being files and file directories, wherein for each replica of an object at a node, a parent directory for the object is replicated at the node, the method comprising:
   propagating an update to a replica of a file directory to other replicas of the file directory via a graph, wherein each replica of the file directory has edges to only a subset of the other replicas such that all the replicas of the file directory are connected via the graph; and
   in response to receiving a propagated update to a replica of the file directory at a node, updating the replica for the file directory at the node.

2. The method according to claim 1, wherein each replica of an object has a backpointer including an identification of a parent directory for the object and a name of the object in the parent directory.

3. The method according to claim 2, wherein the parent directories are modified when the backpointer for a replica of an object at a node is not consistent with the parent directories for the replica of the object at the node.

4. The method according to claim 3, wherein modifying the parent directories occurs only after a delay.

5. The method according to claim 3, wherein multiple modifications to the parent directories at the node are performed according to an order in which corresponding updates occur.

6. The method according to claim 3, wherein a modification is performed at the node and an earlier inconsistent modification is ignored.

7. The method according to claim 2, wherein a directory operation affects the backpointer for the object.

8. The method according to claim 7, wherein the directory operation is selected from a group consisting of rename, link and unlink.

9. The method according to claim 8, wherein when the backpointer for a replica of an object at a node is not consistent with the parent directories for the replica of the object at the node, further comprising modifying the parent directories to be consistent with the backpointer.

10. The method according to claim 1, wherein the replicas of the file directory include core replicas and non-core replicas, the parent directory for the file directory having edges only to the core replicas of the file directory and each core replica of the file directory having edges to one or more of the non-core replicas of the file directory.

11. The method according to claim 10, wherein in response to a user accessing an object at a node when no replica of the object exists at the node, the method further comprises steps of forming a non-core replica of the parent directory for the object at the node and forming a non-core replica of the object at the node.

12. The method according to claim 10, wherein a minimum number of core replicas are maintained according to a minimum replication factor.

13. The method according to claim 1, wherein a replica of an object is deleted by marking the replica as invalid.

14. The method according to claim 13, wherein said marking the replica as invalid comprises removing the backpointer for the replica.

15. The method according to claim 13, further comprising periodically removing replicas marked as invalid.

16. A system including:
a plurality of nodes that store replicas of objects, the objects being files and file directories,
wherein for each replica of an object at a node, the node stores a replica of a parent directory for the object and a backpointer having an identification of the parent directory for the object, and
wherein each replica of a file directory has edges to only a subset of the other replicas of the file directory such that all the replicas of the file directory are connected via the graph and the nodes are configured to propagate updates to replicas of each file directory to other replicas of the file directory via the graph.

17. The system according to claim 16, wherein in response to receiving a propagated update to a replica of the file directory at a node, the node updates the parent directories for the file at the node.

18. The system according to claim 16, wherein when a backpointer for a replica of an object at a node is not consistent with the parent directories for the replica of the object at the node, the node modifies the parent directories to be consistent with the backpointer.

19. The system according to claim 18, wherein the node modifies the parent directories to be consistent with the backpointer only after a delay.

20. The system according to claim 18, wherein multiple modifications to the parent directories at the node are performed according to an order in which corresponding updates occur.

21. The system according to claim 18, wherein a modification is performed at the node and an earlier inconsistent modification is ignored.

22. The system according to claim 16, wherein a directory operation is affects the backpointer for the object.

23. The system according to claim 22, wherein the directory operation is selected from a group consisting of rename, link and unlink.

24. The system according to claim 22, wherein when a backpointer for a replica of an object at a node is not consistent with the parent directories for the replica of the object at the node, the node modifies the parent directories to be consistent with the backpointer.

25. The system according to claim 16, wherein the replicas of the file directory include core replicas and non-core replicas, the parent directory for the file directory having edges only to the core replicas of the file directory and each core replica of the file directory having edges to one or more of the non-core replicas of the file directory.

26. The system according to claim 16, wherein in response to a user accessing an object at a node when no replica of the object exists at the node, a non-core replica of the object and a non-core replica of the parent directory for the object are formed at the node.

27. The system according to claim 16, wherein a replica of an object is deleted by marking the replica as invalid.

28. The system according to claim 27, wherein said marking the replica as invalid comprises removing the backpointer for the replica.

29. The system according to claim 27, further comprising periodically removing replicas marked as invalid.

* * * * *